US010182128B1

(12) United States Patent
Allocca et al.

(10) Patent No.: US 10,182,128 B1
(45) Date of Patent: Jan. 15, 2019

(54) OPTIMIZATION OF PRODUCTION SYSTEMS

(71) Applicant: Amazon Technologies, Inc., Reno, NV (US)

(72) Inventors: William W Allocca, Bellevue, WA (US); James Cade Bodley, Seattle, WA (US); Ram Cherukuri, Bellevue, WA (US); Nitin Sivakrishnan, Seattle, WA (US); Nandan Ulhas Telang, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 102 days.

(21) Appl. No.: 13/797,641

(22) Filed: Mar. 12, 2013

Related U.S. Application Data

(60) Provisional application No. 61/762,253, filed on Feb. 7, 2013.

(51) Int. Cl.
H04L 29/08 (2006.01)
(52) U.S. Cl.
CPC .................... H04L 67/32 (2013.01)
(58) Field of Classification Search
CPC ............... H04L 67/32; G06F 17/30592; G06F 17/30283; G06F 17/30377
USPC .......................................................... 709/201
See application file for complete search history.

(56) References Cited

U.S. PATENT DOCUMENTS

| | | | |
|---|---|---|---|
| 5,630,049 A | 5/1997 | Cardoza et al. | |
| 6,205,449 B1 * | 3/2001 | Rastogi | G06F 11/1471 |
| 6,253,334 B1 | 6/2001 | Amdahl et al. | |
| 6,981,180 B1 | 12/2005 | Bailey et al. | |
| 7,882,496 B2 | 2/2011 | Cognigni et al. | |
| 7,891,004 B1 | 2/2011 | Gelvin et al. | |
| 7,899,901 B1 | 3/2011 | Njemanze et al. | |
| 7,954,090 B1 | 5/2011 | Qureshi et al. | |
| 8,001,422 B1 | 8/2011 | Sun et al. | |
| 8,015,549 B2 | 9/2011 | Cooper et al. | |
| 8,112,262 B1 | 2/2012 | Michelsen | |
| 8,194,552 B1 | 6/2012 | Ye et al. | |
| 8,291,387 B2 | 10/2012 | Pal et al. | |
| 8,327,334 B2 | 12/2012 | Chockler et al. | |
| 8,448,131 B2 | 5/2013 | Ottavi et al. | |

(Continued)

OTHER PUBLICATIONS

Office action for U.S. Appl. No. 14/641,177 dated Sep. 14, 2015, Aiiocca et al., "Shadow Test Replay Service", 20 pages.

(Continued)

*Primary Examiner* — Backhean Tiv
*Assistant Examiner* — Tan Doan
(74) *Attorney, Agent, or Firm* — Lee & Hayes, PC; Charles L. Warner

(57) ABSTRACT

The techniques described herein provide software testing of a candidate version of software. In some examples, an interceptor may perform an asynchronous and non-blocking intercept of at least one request to a production system and may provide the intercepted at least one request to a shadow proxy service as at least one shadow request. The shadow proxy service may process the shadow request by causing the at least one shadow request to be classified based at least one criteria. The processed shadow requests are logged. A selection may be made from among the logged shadow request to be replayed by the production system based on one or more criteria used to classify the shadow requests. The shadow proxy service may replay the selected at least one logged shadow request to the production system.

28 Claims, 13 Drawing Sheets

(56) References Cited

U.S. PATENT DOCUMENTS

| | | |
|---|---|---|
| 8,539,080 B1 | 9/2013 | Uluderya et al. |
| 8,826,239 B2 | 9/2014 | Sawano |
| 8,832,657 B1 | 9/2014 | Cowan et al. |
| 8,843,910 B1 | 9/2014 | Schwerin et al. |
| 8,966,464 B1 | 2/2015 | Christopher et al. |
| 8,990,778 B1 | 3/2015 | Allocca et al. |
| 9,081,899 B2 | 7/2015 | Ahmed et al. |
| 9,912,517 B1 | 3/2018 | Ramalingam et al. |
| 2003/0217166 A1 | 11/2003 | Dal Canto et al. |
| 2004/0064818 A1 | 4/2004 | Alverson et al. |
| 2004/0205695 A1 | 10/2004 | Fletcher |
| 2005/0257086 A1 | 11/2005 | Triou, Jr. et al. |
| 2006/0101476 A1 | 5/2006 | Robert |
| 2006/0129988 A1 | 6/2006 | Calsyn et al. |
| 2006/0256763 A1 | 11/2006 | Nguyen et al. |
| 2007/0050686 A1* | 3/2007 | Keeton ............... G06F 11/261 714/48 |
| 2007/0050768 A1 | 3/2007 | Brown et al. |
| 2008/0059750 A1 | 3/2008 | Ogawa |
| 2008/0097995 A1* | 4/2008 | Dias ............... G06F 17/30377 |
| 2008/0229280 A1 | 9/2008 | Stienhans |
| 2008/0229284 A1 | 9/2008 | Castro et al. |
| 2008/0250097 A1* | 10/2008 | Angelini ............... G06F 9/5027 709/202 |
| 2008/0282112 A1 | 11/2008 | Bailey et al. |
| 2008/0282233 A1 | 11/2008 | Sheppard |
| 2009/0132999 A1 | 5/2009 | Reyes |
| 2009/0307533 A1 | 12/2009 | Niikkonen et al. |
| 2010/0162050 A1 | 6/2010 | Cathro |
| 2010/0305983 A1* | 12/2010 | De Marcken ..... G06F 17/30902 705/5 |
| 2010/0325616 A1 | 12/2010 | Singonahalli et al. |
| 2011/0145790 A1 | 6/2011 | Rajaraman et al. |
| 2011/0145795 A1 | 6/2011 | Khanapurkar et al. |
| 2011/0161488 A1 | 6/2011 | Anderson et al. |
| 2011/0173591 A1 | 7/2011 | Prasad |
| 2011/0222407 A1 | 9/2011 | Matsuo et al. |
| 2011/0231822 A1 | 9/2011 | Sabin et al. |
| 2012/0047492 A1 | 2/2012 | Huang et al. |
| 2012/0054447 A1* | 3/2012 | Swart ............... G06F 12/0888 711/136 |
| 2012/0084433 A1 | 4/2012 | Bar-Caspi et al. |
| 2012/0084605 A1 | 4/2012 | Shilon et al. |
| 2012/0084753 A1 | 4/2012 | Maybee et al. |
| 2012/0159523 A1 | 6/2012 | Kulkarni et al. |
| 2012/0221513 A1* | 8/2012 | Papadomanolakis ........................ G06F 17/30557 707/610 |
| 2012/0221768 A1* | 8/2012 | Bagal ............... G06F 12/0811 711/103 |
| 2012/0290571 A1 | 11/2012 | Lee et al. |
| 2012/0291014 A1 | 11/2012 | Shrinivasan |
| 2013/0117609 A1 | 5/2013 | Dande et al. |
| 2013/0124807 A1 | 5/2013 | Nielsen et al. |
| 2013/0145006 A1 | 6/2013 | Tammam |
| 2013/0198226 A1 | 8/2013 | Dhuse et al. |
| 2013/0275877 A1 | 10/2013 | Varner et al. |
| 2013/0298183 A1 | 11/2013 | McGrath et al. |
| 2013/0318512 A1 | 11/2013 | Kuppala et al. |
| 2014/0026122 A1 | 1/2014 | Markande et al. |
| 2014/0040883 A1 | 2/2014 | Tompkins |
| 2014/0047140 A1 | 2/2014 | Otenko et al. |
| 2014/0068567 A1 | 3/2014 | Smith et al. |
| 2014/0068611 A1 | 3/2014 | McGrath et al. |
| 2014/0365554 A1 | 12/2014 | Bleau et al. |
| 2016/0044531 A1 | 2/2016 | Papa et al. |
| 2016/0239343 A1 | 8/2016 | Holt |

OTHER PUBLICATIONS

Office action for U.S. Appl. No. 14/498,862, dated Feb. 26, 2016, Kulkarni et al., "Software Container Activation and Throttling", 48 pages.

Office action for U.S. Appl. No. 14/641,177, dated Mar. 24, 2016, Allocca et al., "Shadow Test Replay Service", 22 pages.

Office action for U.S. Appl. No. 14/498,880 dated Jun. 6, 2016, Beranek et al., "Software Container Activation and Throttling", 26 pages.

Office action for U.S. Appl. No. 14/641,177, dated Jul. 15, 2016, Allocca et al., "Shadow Test Replay Service", 59 pages.

Office action for U.S. Appl. No. 14/498,862, dated Jul. 15, 2016, Kulkarni et al., "Software Container Activation and Throttling", 38 pages.

Brodovsky, et al.,"A/B Testing at SweetIM: the Importance of Proper Statistical Analysis", 11th IEEE International Conference on Data Mining Workshops, 2011, pp. 733-740.

Crameri, et al., "Staged Deployment in Mirage, an Integrated Software Upgrade Testing and Distribution System", SOSP'07, SIGOPS Symposium on Operating Systems Principals, Oct. 14-17, 2007, Stevenson, Washington, ACM, pp. 221-236.

Orso, et al., "Gamma System: Continuous Evolution of Software after Deployment", Proceedings of the 2002 ACM SIGSOFT International Symposium on Software Testing and Analysis, ACM, 2002, pp. 65-69.

Office action for U.S. Appl. No. 14/498,874, dated Sep. 23, 2016, Kulkarni et al., "Software Container Activation and Throttling", 23 pages.

Office action for U.S. Appl. No. 14/498,862, dated Jan. 27, 2017, Kulkarni et al., "Software Container Activation and Throttling", 21 pages.

Andrica et al., "WaRR: A tool for high-fidelity web application record and replay", IEEE, 2011, pp. 403-410.

Office action for U.S. Appl. No. 14/498,880 dated Feb. 21, 2017, Beranek et al., "Software Container Activation and Throttling", 28 pages.

Office action for U.S. Appl. No. 14/498,874, dated Feb. 3, 2017, Kulkarni et al., "Software Container Activation and Throttling", 29 pages.

Tsai et al., "A noninterference monitoring and replay mechanism for real-time software testing and debugging," IEEE Transactions on Software Engineering, vol. 16, Issue 8, Aug. 1990, pp. 897-916.

Wang et al., "Real application testing with database replay," 2009, DBTest '09, ACM, 2009, 6 pages.

Office Action for U.S. Appl. No. 14/038,583, dated Oct. 10, 2014, Samuel Leonard Moniz, "Duplicating Proxy Service", 43 pages.

Office Action for U.S. Appl. No. 14/038,619, dated Oct. 14, 2014, Samuel Leonard Moniz, "Duplicating Proxy Service", 43 pages.

Office action for U.S. Appl. No. 14/498,880, dated Oct. 28, 2015, Beranek et al., "Software Container Activation and Throttling", 19 pages.

Office action for U.S. Appl. No. 14/038,619, dated Oct. 6, 2016, Moniz et al., "Duplicating Proxy Service", 61 pages.

Office action for U.S. Appl. No. 14/038,619 dated Feb. 10, 2016, Moniz et al., "Duplicating Proxy Service", 63 pages.

Office action for U.S. Appl. No. 14/038,583, dated Feb. 11, 2016, Moniz et al., "Duplicating Proxy Service ", 53 pages.

Final Office Action for U.S. Appl. No. 14/038,619, dated Mar. 13, 2015, Samuel Leonard Moniz, "Duplicating Proxy Service", 48 pages.

Office Action for U.S. Appl. No. 14/038,583, dated Mar. 19, 2015, Samuel Leonard Moniz, "Duplicating Proxy Service", 43 pages.

Office action for U.S. Appl. No. 14/038,619, dated Mar. 8, 2017, Moniz et al., "Duplicating Proxy Service", 61 pages.

Office action for U.S. Appl. No. 14/038,583, dated Jul. 14, 2016, Moniz et al., "Duplicating Proxy Service", 54 pages.

Office action for U.S. Appl. No. 14/038,619, dated Aug. 26, 2015, Moniz et al., "Duplicating Proxy Service", 59 pages.

Office action for U.S. Appl. No. 14/038,583, dated Aug. 27, 2015, Moniz et al., "Duplicating Proxy Service", 51 pages.

Office Action for U.S. Appl. No. 14/498,862, dated Jul. 26, 2017, Kulkarni et al., "Software Container Activation and Throttling", 20 pages.

Office Action for U.S. Appl. No. 14/498,880, dated Sep. 12, 2017, Beranek, "Software Container Activation and Throttling", 28 pages.

(56) References Cited

OTHER PUBLICATIONS

Office Action for U.S. Appl. No. 14/498,862, dated Dec. 26, 2017, Kulkarni et al., "Software Container Activation and Throttling", 20 pages.
Office Action for U.S. Appl. No. 14/498,880 dated Apr. 9, 2018, Beranek et al., "Software Container Activation and Throttling", 27 pages.

* cited by examiner

OPTIMIZATION OF PRODUCTION SYSTEMS

The present application claims priority to U.S. Provisional Application Ser. No. 61/762,253, filed on Feb. 7, 2013, entitled "Optimization Of Production Systems."

BACKGROUND

Various systems, such as electronic commerce systems, may have delays associated with various functions. For example, when an off-line machine is brought online, the lack of cached data may result in delays in the processing of incoming requests while the data is loaded. In other systems, data may be loaded in a form that the system of must convert prior to use. Delays may occur while the data is being converted. Therefore, it is desirable for systems to alleviate such delays to increase, among other things, customer satisfaction.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to the use of system resources to optimize processing of requests from, for example, external systems. In some implementations, requests may be replayed to a production (or "live") system, or a subunit of the production system, to prepare the production system to handle incoming request traffic. For example, in some implementations, a shadow proxy service may replay previously intercepted requests to a production system to "warm-up" the production system for operation. In a more specific example, a production fleet machine being brought from an off-line status to an operational status may, as part of this transition, have one or more shadow requests replayed to the production fleet machine which "warm-up" the cache of the production fleet machine. This may allow the production fleet machine to more efficiently handle production requests when it is brought into operational status. In some implementations, an external system may be utilized to convert system data provided to the production system in a first form into a second form. In some implementations, the first form is a form that is non-native, non-machine-readable, and/or otherwise not in a form used directly by the production system. Typically, system data in such a first form is loaded and converted by the production system into a second form that is native to the production system (i.e. directly usable in memory by the production system). In some systems that utilize the external system to convert the system data into the second form, the second form may be a native form to the production system software or may be a form that is more easily consumed and converted to the native form by the production system software. In some implementations, the production system may utilize external or internal services that adapt the internal or external communications caching of the production system to optimize the caching of communications, such as requests. For example, in a production system that includes multiple services that make inter-service requests to one another, some implementations may utilize an optimization service to optimize the caching of the inter-service requests.

The discussion above provides various examples of the implementations of the techniques and systems provided herein. These examples should not be taken as limiting. The techniques and systems described herein may be implemented in a number of ways. Example implementations are provided below with reference to the following figures.

Illustrative Environment

Figure 1:
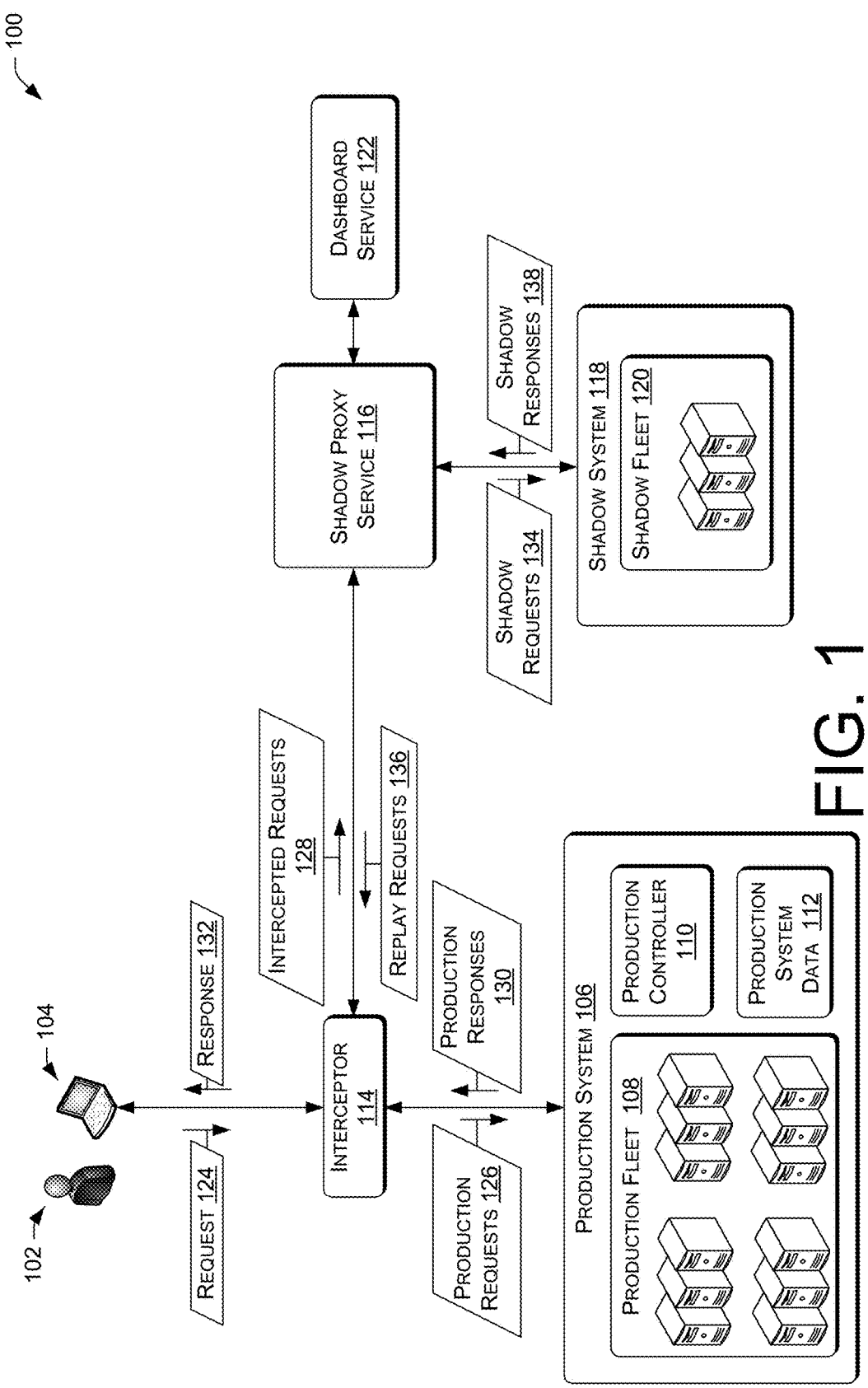
FIG. 1 is a schematic diagram of an illustrative environment that provides for, among other things, the replaying of requests to a production (or "live") system to prepare the production system to handle incoming request traffic.

FIG. 1 is a schematic diagram of an illustrative environment 100 that provides for, among other things, the replaying of requests to a production (or "live") system, or a subunit of the production system, to prepare the production system to handle incoming request traffic. As alluded to above, some implementations may utilize a shadow system and/or a shadow proxy service. When responding the production requests, the production system, unlike the shadow system, may update production system data and may transmit data back to the end users while the shadow request does not output to the users and/or affect the production system beyond the processing of the shadow request. For example, such production system data may include transactional data regarding transaction with user 102 that have an affect outside of the actual processing of the production request (e.g., an item is shipped to the user 102 in response to processing a production request that orders and item). In some implementations, the shadow requests are based on actual requests (e.g. production requests intercepted at the time they were submitted to the production system). In some implementations, an interceptor module may use sampling rules to intercept production requests and forward shadow requests to the shadow proxy service based on various factors, rules or logic. Thus, not all production requests may be intercepted as shadow requests. As each shadow request is received and processed by a shadow proxy service, the shadow proxy service system may analyze and classify the shadow request (e.g. the shadow proxy service may extract a shadow fleet to execute the shadow requests and analyze the resulting request/response pair to classify the shadow request. The shadow proxy service system may log data about the shadow requests on a request-by-request or aggregate basis. Some or all of the data may then be presented via a dashboard service. The dashboard service may be used to replay one or more shadow requests for various purposes, such as to replay the request to the production system.

As shown in FIG. 1, the illustrative environment includes a user 102 operating a user device 104, a production system 106 including a production fleet 108, a production controller 110 and production system data 112, an interceptor 114, a shadow proxy service 116 operating a shadow system 118 that includes a shadow fleet 120, and a dashboard service 122. While shown as stand-alone items, one of ordinary skill in the art would understand that the shadow system 118 and the shadow fleet 120 may be operated by system resources, such as shadow proxy service system resources, production system resources or other system resources. These system resources may be computing devices, distributed or non-distributed computing services, server farm(s) or other types of resources that can execute the various versions of the software. FIG. 1 also illustrates an exemplary shadow proxy service system which, in the implementation shown in FIG. 1, includes the interceptor 114, the shadow proxy service 116, and the dashboard service 122. In some implementations, the shadow proxy service system may comprise a shadow framework. In some such implementations, the shadow test framework may be exposed as a web service for external clients.

In operation, the user 102 (e.g., a downstream consumer or user) may, using a user device 104, transmit a request 124 for electronic data from the production system 106. However, in some implementations, the request 124 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate various versions of the software that are executable in a framework and processed by production system resources. The versions may include the production version of software that is currently deployed to fulfill user requests, such as request 124. As mentioned above, the production system 106 includes the production fleet 108, the production controller 110 and the production system 112. Herein, fleets are made up of system resources. These system resources may be computing devices, distributed computing services, server farm(s), or other types of resources that can execute the various versions of the software. Accordingly, the production fleet 108 includes the system resources that are utilized by the production system 106 to, among other functions of the production system 106, process production requests 126. The production controller 110 may be utilized by user of the production system as well as external systems and/or users to control the operation of the production fleet 106. For example, the production controller 110 may receive instructions from the shadow proxy service 116 to perform specific operations. Such instructions will be discussed in more detail below. The production system data 112 includes various system data utilized by the production fleet 108 in the processing and fulfillment of production requests 126. For example, the production system data 112 may include rule files that are utilized in request processing.

The interceptor 114 intercepts at least some requests sent to the production system 106, such as the request 124, and forwards (or publishes) the requests to the production system 106 as production requests 126 and to the shadow proxy service 116 as intercepted requests 128. The production system 106 processes the production requests 126 normally using the production version of the software and replies with production responses 130. In the example implementation shown in FIG. 1, the interceptor 114 acts as a relay, receiving the production responses 130 and forwarding the production response 130 to their respective recipients. For example, the interceptor 114 relays the production response 130 that corresponded to the request 124 to the user device as a response 132. While the example implementation shown in FIG. 1 shows the interceptor 114 operating as a relay in the manner discussed above, this is not limiting and has been done for ease of illustration. In other implementations, the production system 106 could reply directly without the interceptor 114 acting as relay.

As discussed above, in addition to forwarding production requests 126 to the production system 106, the interceptor 114 forwards the requests (such as requests 124) to the shadow proxy service 116 as intercepted requests 128. To handle intercepted requests 128 and shadow operations in general, the shadow proxy service system may use a protocol for shadow operations with standardized meta-data for requests and responses. For example, regarding the metadata, the interceptor 114 may extract some basic metadata about the request 124, service, and/or realm and forwards the metadata to the shadow proxy service 116 along with or as part of the intercepted request 128. The interceptor 114 may operate so as to allow the requests to be intercepted in an asynchronous, non-blocking manner and sent to the shadow proxy service 116 to minimize the potential for disruption of the production system 106 due to, for example, failures in the shadow proxy service system (e.g., a failure of the interceptor 114). In some implementations, the publishing of requests to the shadow proxy service 116 may be configurable, such as on a per API level. Some configurable parameters may include a publishing percentage, a sampling methodology, etc.

The shadow proxy service 116 receives and processes the intercepted requests 128. To process an intercepted request 128 that corresponds to the request 124, the shadow proxy service 116 may operate to replay the request 124 to the shadow system 118 for processing by the shadow fleet 120. This is illustrated in FIG. 1 as shadow requests 134. The shadow system 118 may operate using the production version of the software used by the production system 106 or may operate using an altered version of the software. For example, in some implementations, the shadow system 118 may operate an instrumented version of the software that is compiled with flags set to include code to output information about the processing of the shadow requests 134. One example implementation may instrument code of the altered version to output indications of code coverage. For example, the altered version of the software may be instrumented such that when a portion of the code is executed, it outputs an indication of its execution. Such instrumenting could be coded into the source code of the software from which both the production and the shadow versions are compiled. The source code may be selectively compiled based on a flag during the compilation process. Thus, when a shadow version is to be generated by the compiler, the flag would be set and the instrumentation code would be compiled into the shadow version. When a production version of the software is to be compiled, the flag would not be set and the compiler would ignore instrumentation code. In another example implementation, the instrumentation code may provide other information, such as an output of the internal representation of system data. In a particular example, the instrumentation code may output an internal representation of rule data which is used to process requests. Such example implementations are discussed with respect to FIGS. 6 and 9-10 and 12-13.

The shadow fleet 120 receives the shadow requests 134 from the shadow proxy service 116 and processes the received shadow requests 134 according to its respective version of the software. Unlike the processing performed by the production system 106 for the production request 124, the processing at the shadow system 118 is not revealed to the user 102 and/or does not modify data used by the production system 106. Thus, any outputs and/or manipulations of data from the shadow system 118 are not seen by the user 102 and/or used to generate data that is later output to the user 102. Instead, the processing by the shadow system 118 is used by the shadow proxy service 116 for logging the shadow requests 134 for later use. Upon completion of the processing of each of the shadow requests 134, the shadow system 118 sends a shadow response 136 to the shadow proxy service 116.

Upon receiving a shadow response 136, the shadow proxy service 116 may analyze the fields contained in the shadow response 136 along with other information and logs the results. The results of the comparison and the logs are then available for use by the components of the shadow proxy service 116 and dashboard service 122, as will be discussed in more detail below with respect to FIG. 2-5.

Illustrative Computing Architecture

Figure 2:
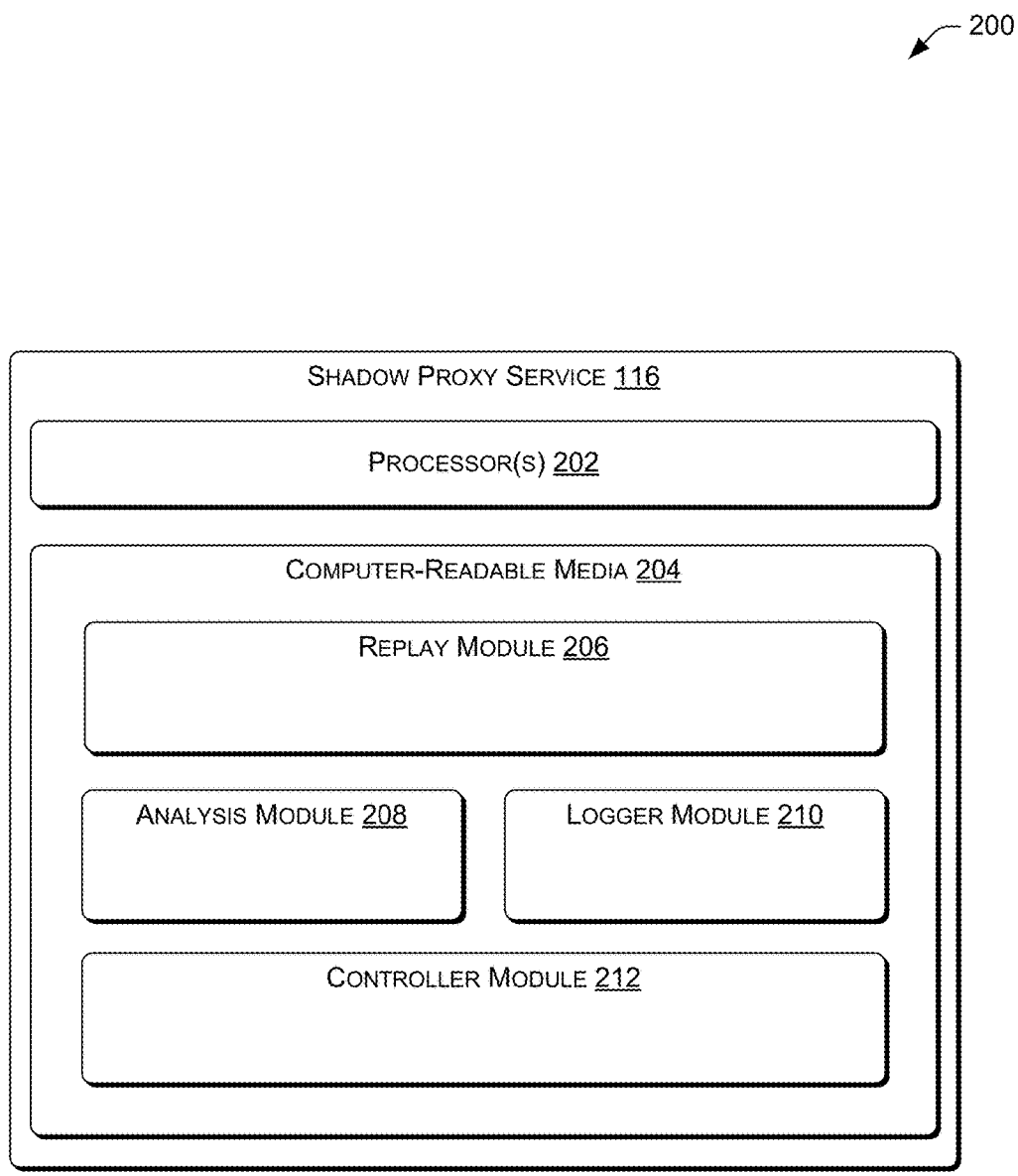
FIG. 2 is a schematic diagram of an illustrative computing architecture to provide for analysis of intercepted requests and for replay of the intercepted requests to a shadow system and a production system.

FIG. 2 is a schematic diagram of an illustrative computing architecture 200 of an example shadow proxy service 116 according to some implementations that may provide for analysis of intercepted requests 128 and for replay of the intercepted requests 128 to the shadow system 118 and the production system 106. The computing architecture 200 may be implemented in a distributed or non-distributed computing environment.

The computing architecture 200 may include one or more processors 202 and computer readable media 204 that stores various modules, applications, programs, or other data. The computer-readable media 204 may include instructions that, when executed by the one or more processors 202, cause the processors to perform the operations described herein for the shadow proxy service 116. In some embodiments, the computer-readable media 204 may store a replay module 206, an analysis module 208, a logger module 210 and a controller module 212, which are described in turn. The components may be stored together or in a distributed arrangement.

The replay module 206 may operate to replay the intercepted requests 128 to the shadow system 118 and the production system 106. In summary, in some implementations, the replay module 206 operates to impersonate the entity making the request and interacts with the shadow system 118 and production system 106 in accordance with this role. In some implementations, the replay module 206 operates to dynamically modify at least some of the parameters of the intercepted requests 128 before replaying the intercepted requests 128 to the shadow system 118 and production system 106 as the shadow requests 134 and replay requests 136. For example, the replay module 206 may modify the shadow requests 134 to the shadow version of the software to remove user 102 specific information and/or to simulate specific behavior for analysis and logging purposes. In such an implementation, the replay module 206 may preserve the integrity of the modified shadow request, apart from the intended modifications, to faithfully replay the shadow request. Upon receiving the shadow response 138 corresponding to a particular shadow request 134, the replay module 206 publishes these items to the analysis module 208. In the case of the replay requests 136, the replay module 206 may replay modified intercepted requests 128 to the production system 106 such that the production system processes the requests 136 but does not ultimately implement the outcome of the processing. For example, in the case of an electronic commerce system in which a particular intercepted request 128 is a purchase request by the user 102, the corresponding replay request 136 may be modified such that the production system 106 processes the replay request 136 but does not bill the user 102 for the replayed request or ship a duplicate of the originally purchased item(s) to the user 102. Specific examples of such use of the replay module 206 will be discussed below such as with respect to FIGS. 3-5.

The analysis module 208 may receive the shadow request 134/shadow response 136 pair and, in some implementations, the analysis module 208 tags and/or classifies at least some of the aspects that are ascertained for the request/response pair. For example, the analysis module 208 may tag or classify the request/response pair based at least in part on criteria which may be specified to be important to the functioning of the software or other categorization system that may be created by the dashboard service or a user thereof. In some implementations, extensible modeling language based definitions may be used to define the analysis and categorization by the shadow proxy service 116 based on a standardized format. Using such definitions, the analysis module 208 may be able to categorize intercepted requests 128 (or the shadow request/response pair). Of course, in some implementations, such categorization may be implemented at a variety of levels and/or other modules rather than by the analysis module 208. The results of the analysis module 208 are provided to the logger module 210.

The logger module 210 shown in FIG. 2 may log data related to the intercepted requests 128 which have been processed by the replay module 206 and the analysis module 208. The logger module 210 may log all data relating the shadow requests or some appropriate subset, depending on the particular implementation and configuration settings. In some implementations, the logger module 210 may store the requests, responses and the results of the analysis thereof in distributed computing-based storage, with indexed fields for searching.

As mentioned above, many operations of the replay module 206, the analysis module 208 and the logger module 210, as well as the interceptor 114, are configurable. In the implementation shown in FIG. 2, the configuration settings are controlled at least in part by a controller module 212. In particular, the controller module 212 may control aspects of the interceptor 114 and the shadow proxy service 116 relating to determining which of the requests 124 are intercepted and processed as the intercepted requests 128, which of the intercepted requests 128 are actually processed by the shadow proxy service 116 as described above, and so on. The controller module 212 may interact with the various systems and users (such as the dashboard service 122) to obtain the configuration settings for the shadow proxy service 116. Each of the replay module 206, the analysis module 208 and logger module 210 may refer to the controller module 212 to obtain configuration information or the controller module 212 may directly configure the other modules. One example operation of the controller module 212 which will be discussed in more detail below may be to configure the replay module 206 to "warm-up" the cache of a targeted production machine of the production system 106 prior to the targeted production machine being brought into operational status. Various examples will be discussed below.

In one such "warm-up" procedure, the replay module 206 may be configured to replay recent requests to the targeted production machine of the production system 106 to allow the targeted production machine to have an operational level of caching when enabled for production request traffic. Various methods may be used to determine which recent requests to replay to the targeted production machine. In some implementations, the replay module 206 may select a set of recent requests which provide a representative sample of use cases exercised by recent production requests (e.g. to the production system 106 as a whole) while attempting to minimize the number of replay requests. Such a representative sample may be determined based on various factors such as a requirement that some measurement of code paths exercised by recent production requests have been exercised at the targeted production system machine. While discussed in the context of recent requests above, implementations are not so limited and may use a predefined a mix of use cases represented by a pre-selected, randomly selected, or dynamically selected logged requests during the "warm-up" procedure. In addition to the configurability discussed above, the shadow proxy service system of some implementations may allow for pluggable modules based on standardized interface. Such implementations may allow for custom modules which adhere to the standardized interface to be plugged into the shadow proxy service system in place of the default modules (e.g. a custom analysis module 208 and custom logger module 210 in place of the default modules).

Figure 3:
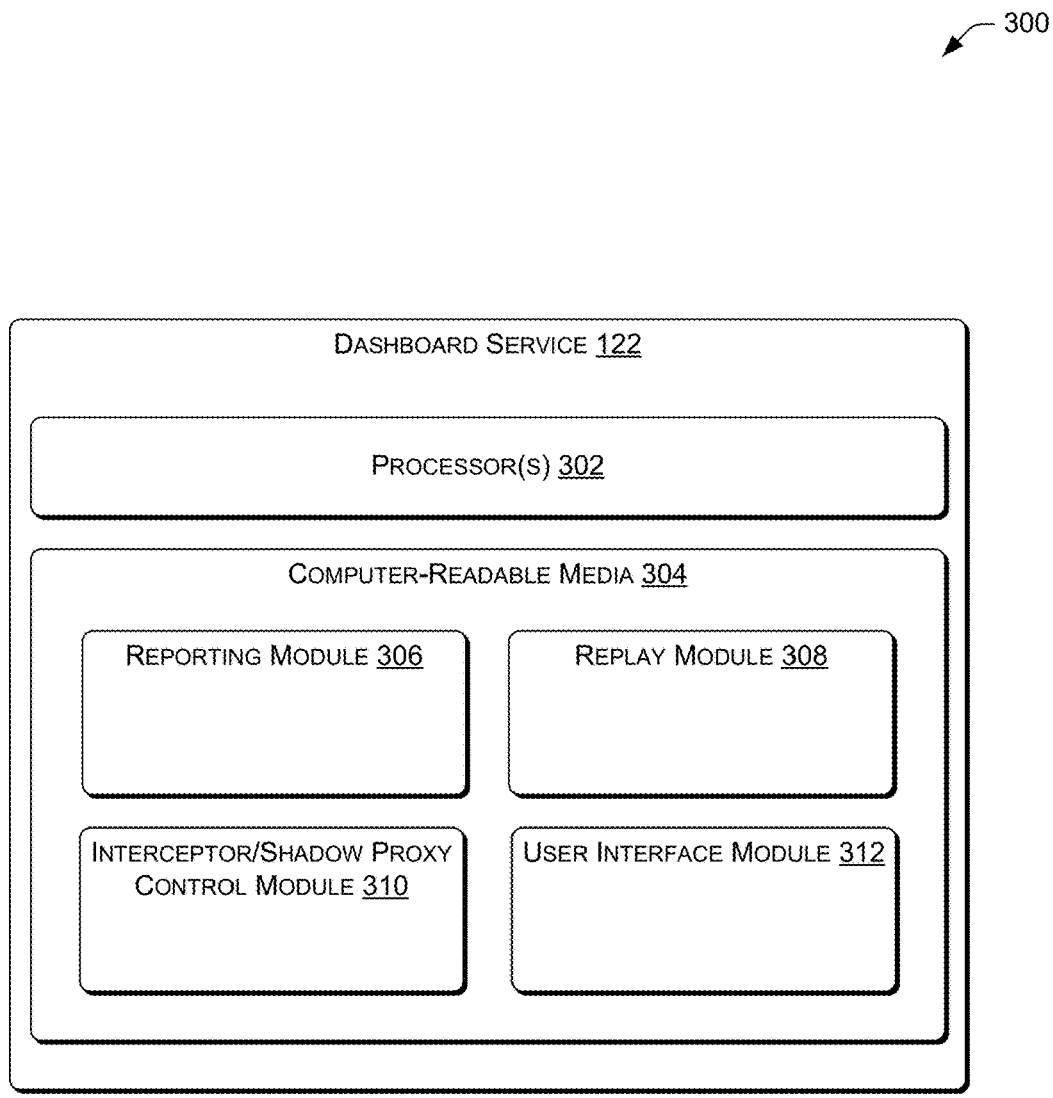
FIG. 3 is a schematic diagram of an illustrative computing architecture to provide a dashboard service for interaction with and/or control of the shadow proxy service.

FIG. 3 is a schematic diagram of an illustrative computing architecture 300 of an example dashboard service 122 that provides interaction with and/or control of the shadow proxy service 116. The computing architecture 300 may be implemented in a distributed or non-distributed computing environment.

Similar to the computing architecture 200, the computing architecture 300 may include one or more processors 302 and computer readable media 304 that stores various modules, applications, programs, or other data. The computer-readable media 304 may include instructions that, when executed by the one or more processors 302, cause the processors to perform the operations described herein for the dashboard service 122. In some embodiments, the computer-readable media 304 may store a reporting module 306, a replay module 308, an interceptor/shadow proxy control module 310 and a user interface module 312, which are described in turn. The components may be stored together or in a distributed arrangement.

As mentioned above, the dashboard service 122 may provide for interaction with and/or control of the interceptor 114 and/or shadow proxy service 116. In some implementations, the dashboard service 122 provides the interaction and/or control, in at least two regards. First, the dashboard service 122 collects and parses the results logged by the logger module 210 then provides users of the dashboard service 122 with this information. Second, the dashboard service 122 interacts with the controller module 214 to configure the interceptor 114 and/or shadow proxy service 116 and/or to setup and request replay of one or more intercepted requests 128, such as a set of the intercepted requests 128 represented in the logs generated by the logger module 210 or the intercepted requests 128 as received from the interceptor 114. To select the one or more logged or stored intercepted requests 128 to be replayed, the dashboard service 122 may provide search and display capability for stored requests and/or categories or classifications of stored requests.

The general purpose of modules 306-312 in the example implementation shown in FIG. 3 is discussed below, followed by a discussion of the example operations performed by, or caused to be performed by, these modules.

The reporting module 306 may operate to collect or receive the data generated by the logger module 210 and any other data, and prepare the data for presentation to a user via the user interface module 312. For example, the reporting module 306 may collect logged data and generate trend data for presentation in a graph.

The replay module 308 may operate in the manner discussed above to cause one or more of the logged intercepted requests 128 to be replayed. In some implementations, this is performed by requesting that the shadow proxy service 116 replay the intercepted requests 128 with any desired changes in the setup. Though not illustrated in the figures, in some implementations, the dashboard service 122 may include a copy of the production version and/or the shadow version or the replay module 308 may interact directly with one or more of these versions of the software. In such an implementation, the replay module 308 would replay the intercepted requests 128 directly to the appropriate version of the software and/or make the appropriate analysis of the results. One example reason for replaying the intercepted requests 128 to a shadow version of the software would be to determine if a proposed optimized caching scheme for inter-service caching correctly operates. The results of the replay of the intercepted requests 128 would be passed, for example, to the reporting module 306 for preparation for presentation to the user via user interface module 312 (possibly after being analyzed by the analysis module 208, the logger module 210 and/or other similar modules).

The interceptor/shadow proxy control module 310 operates to allow for configuration and/or control of the interceptor 114 and shadow proxy service 116 by, for example, a user of the dashboard service 122 interacting with the dashboard service 122 through user interface module 312. An example control that may be performed by the control module 310 would be to configure analysis module 208 to tag requests based on specified criteria such as time of day, time of year, region of origin, whether the requests relate to events (such as a promotion in an electronic commerce setting). As indicated above, the user interface module 312 of the dashboard service 122 presents a user interface to dashboard service users to allow for interaction by the user with the shadow proxy service system.

The dashboard service 122 discussed above may be used to control the combination of the interceptor 114 and the shadow proxy service 116 in various ways such as those discussed below.

As alluded to previously, through interaction with the dashboard service 122, a dashboard user is able to configure the duration of a "warm-up" of a targeted production machine, such as by configuring conditions upon which the replay module 206 stops replaying requests to the production system 106. Further, the dashboard user may be able to control other aspects of the replay, such as the "type" of warm-up or replay procedure to be performed. Some types of conditions and types of replays are described below.

One example condition for controlling the duration of the "warm-up" procedure is a specified mix of use cases represented by the intercepted requests 128, such as m number of a first use case of shadow requests, n number of a second use case of shadow requests, and so on. Use cases of particular intercepted requests 128 could be determined by the tagging and/or classifying function of the analysis module 208 discussed above. In the case of using currently received intercepted requests to "warm-up" a production fleet machine, in addition to using the mix of use cases to drive the duration of the "warm-up" procedure, the dashboard service 122 could use the determined use cases to provide information on the distribution of use cases currently being received by the production system to the dashboard users via the reporting module 306 and user interface module 312. In some implementations, the use case reporting may be updated on a real-time basis as intercepted requests 128 are received by the shadow proxy service 116 and replayed to the targeted production machine. Such use case information could be presented in a textual manner or in a visualization (such as a chart) for ease of comprehension. Of course, the determination of use cases and subsequent presentation of the distribution of the use cases represented by the intercepted requests 128 that have been replayed may also be performed without the use of this information to control the duration of the warm-up procedure. Another example condition for controlling the duration of the "warm-up" procedure is a measure of code coverage and such a procedure was discussed above.

One example "type" of replay procedure was described above in the sense of a pure "warm-up" procedure. In particular, the use of the replay procedure was to replay recent requests to a target production system machine prior to that machine being put into operation in the production system 106. Another above described variant on this "type" of replay procedure utilizes intercepted requests that were intercepted at an earlier time and logged by the logger module 210 after being analyzed and classified by the analysis module 208. As discussed above, in either variant of this type of replay procedure, the target production system machine is kept in an off-line or "warm-up" mode for the period of time that replay requests are replayed to the target production system machine. Once the shadow proxy service system has determined that enough intercepted requests 128 have been replayed to the target production system machine, (i.e., the system determines that the caches of the target production system machine are "warmed-up"), the target production machine is enabled for operation on production system request traffic.

Another example "type" of replay procedure may be utilized to allow the production system 106 to shift from one type of production request traffic to another type of production request traffic in accordance with different times of day. In some implementations, this may be a shift from one mix of types of production requests to another mix of types of production requests. For example, for some electronic commerce services, production request traffic may shift from heavily focused requests for purchasing or shopping for items to including a substantial amount of production requests for movie and TV watching between the hours of 8:00 PM and 10:00 PM (i.e., there may be a surge in production request for movies and TV watching). If the surge is rapid, much of the data required to fulfill the requests for the movie and TV watching may not be present in the caches of the production system machines. In some conventional systems, when the production request traffic surges to another type of production request traffic, the production system may run slowly while the newly requested data is fetched and cached. Some implementations may operate to avoid such degradation in performance. For example, in some implementations, a random selection of intercepted requests 128 from the day before, for the time period from the hours of 8:00 PM and 10:00 PM, is replayed to the production system 106 beginning at 7:00 PM. As a result, the caches of the production fleet 108 will be prepared for the surge in requests that begin to be received around 8:00 PM. Of course, the system is not limited to the use of random requests from the previous time period. Instead, in some implementations, the requests to the replayed may be selected based on the content of the surge that is expected to occur.

The determination that surges in traffic are occurring which the production system 106 is otherwise not prepared to handle (i.e. the production system machines do not have the corresponding data need to fulfill the request cached) may be done using a variety of techniques. For example, users of the production system 106 may receive reports of delays in processing of certain types requests that are made at different times of day and determined that pattern occurs at a particular point in time. In some implementations, the production controller 110 may include an analysis function that analyzes the performance of the production system 106 and determines patterns in the response times of the production system 106. In such cases, machine learning may be used to allow the production controller 110 to instruct the shadow proxy service system to replay requests to the production system 106 along with various details of what to replay. At the next occurrence of the surge, the performance of the production system 106 could be compared to the previous performance and a revised "replay plan" may be provided to the shadow proxy service system. The adaptation of the "replay play" could be performed regularly, performed for a limited number of periods (e.g. daily for two weeks) or performed until the performance at the time of the surge is considered optimal (e.g., until a minimal amount of degradation in performance is seen at the beginning of the surge without causing noticeable performance degradation in request received before the surge).

Another example "type" of replay procedure may prepare the production system 106 for "event specific" request traffic, such as request traffic regarding a time-limited promotional offer in the context of e-commerce systems. In some conventional systems in which an event, such as the aforementioned promotional offer, has a specific start date and time, processing of requests regarding the event may be slow when the event begins as the caches of the production fleet 108 are not prepared for the requests and contain little or no information required to fulfill requests related to the event. In the example implementation of a time-limited promotional offer in the context of e-commerce systems, the replay procedure may be utilized as follows. Sometime before the promotional offer becomes active (e.g., an hour), the shadow proxy service 116 may receive instruction from the dashboard service 122 to construct replay requests 138 relevant to the promotional offer based on intercepted requests 128 previously classified as being related to similar promotional offers. In some implementations, the shadow proxy service 116 transforms the intercepted requests 128 to be more relevant to the upcoming promotional offer. For example, the constructed replay requests 138 may have a request date set for one hour in the future, the time of the upcoming promotional offer. The shadow proxy service 116 then plays the replay requests 138 to the production fleet 108 by submitting the replay requests 138 to the interceptor 114. Once the production fleet 108 has processed the replay requests 138, the promotional offer data will be cached when the promotional offer becomes active for customers, thereby alleviating performance problems due to the lack of appropriate caching when the promotional offer becomes active.

The types of the replay procedures discussed above are merely examples and should not be taken as limiting. Various other types of replay procedures or utilizations of the replay procedure would be apparent to one of ordinary skill in the art in view of this disclosure.

Illustrative Operation

Figure 4:
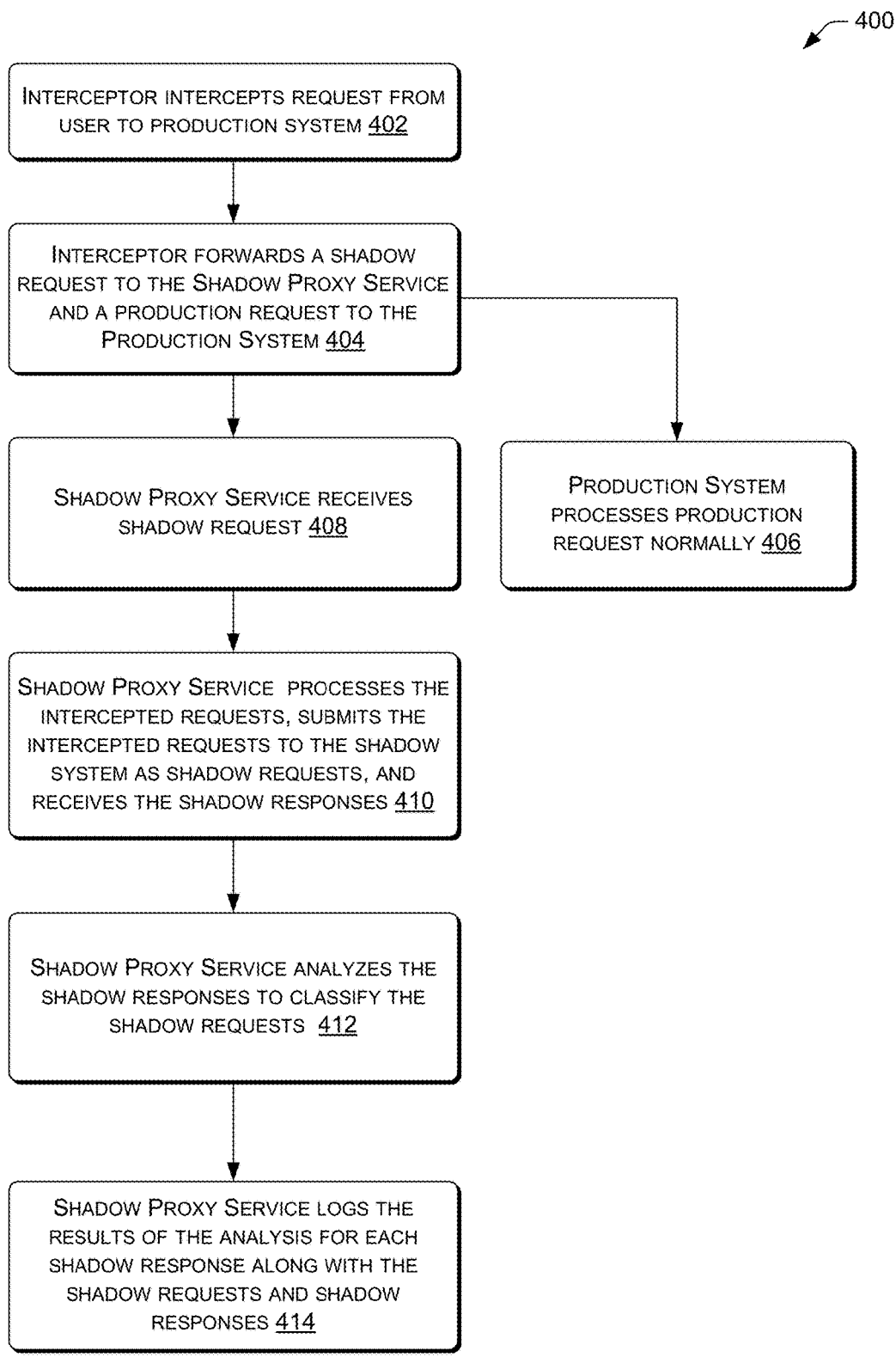
FIG. 4 is a flow diagram of an illustrative process to perform intercepting and logging of requests.

FIG. 4 is a flow diagram of an illustrative process 400 that provides for the intercepting and logging of requests as described above regarding FIGS. 1-3 and may be performed by the shadow proxy service 116 in conjunction with the production system 106, the interceptor 114, and the dashboard service 122. Of course, the process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure (e.g., FIGS. 5, 8, 10 and 13), in addition to process 400, shall be interpreted accordingly.

At 402, the interceptor 114 intercepts a request 124 from the user 102 to the production system 106. At 404, the interceptor 114 forwards the intercepted request 128 to the shadow proxy service 116 and a corresponding production request 126 to the production system 106. At 406, the production system 106 processes the production request 126 normally such that a production response 130 is sent back to the user device 104. Similarly, at 408, the shadow proxy service 116 receives the intercepted request 128 and processes the intercepted request 128 by submitting the intercepted request 128 to the shadow system 118 as a shadow request 134 and receives the shadow response 138 after the shadow fleet 120 has processed the shadow request 134.

At 412, the shadow proxy service analyzes the shadow request/response pairs to classify the shadow requests 134. As discussed above, there are a variety of classifications schemes may be utilized depending on the details of the particular implementation. Some example classification schemes may relate to the time of day the request corresponding to the shadow request was made, a subject of the requests, a use case of the request, the code coverage of the requests, a category of requests, requester or response, etc.

Finally, at 414, the shadow proxy service 116 may log the results of the processing and analysis of the request/response pair. The shadow proxy service 116 may store the logged information in a variety of ways, such as in local, remote or distributed storage. In some implementations, the logged shadow requests may be stored in a searchable catalog organized in a hierarchical manner. Another storage option is to create an index where each shadow request 134 is labeled with a unique ID.

Figure 5:
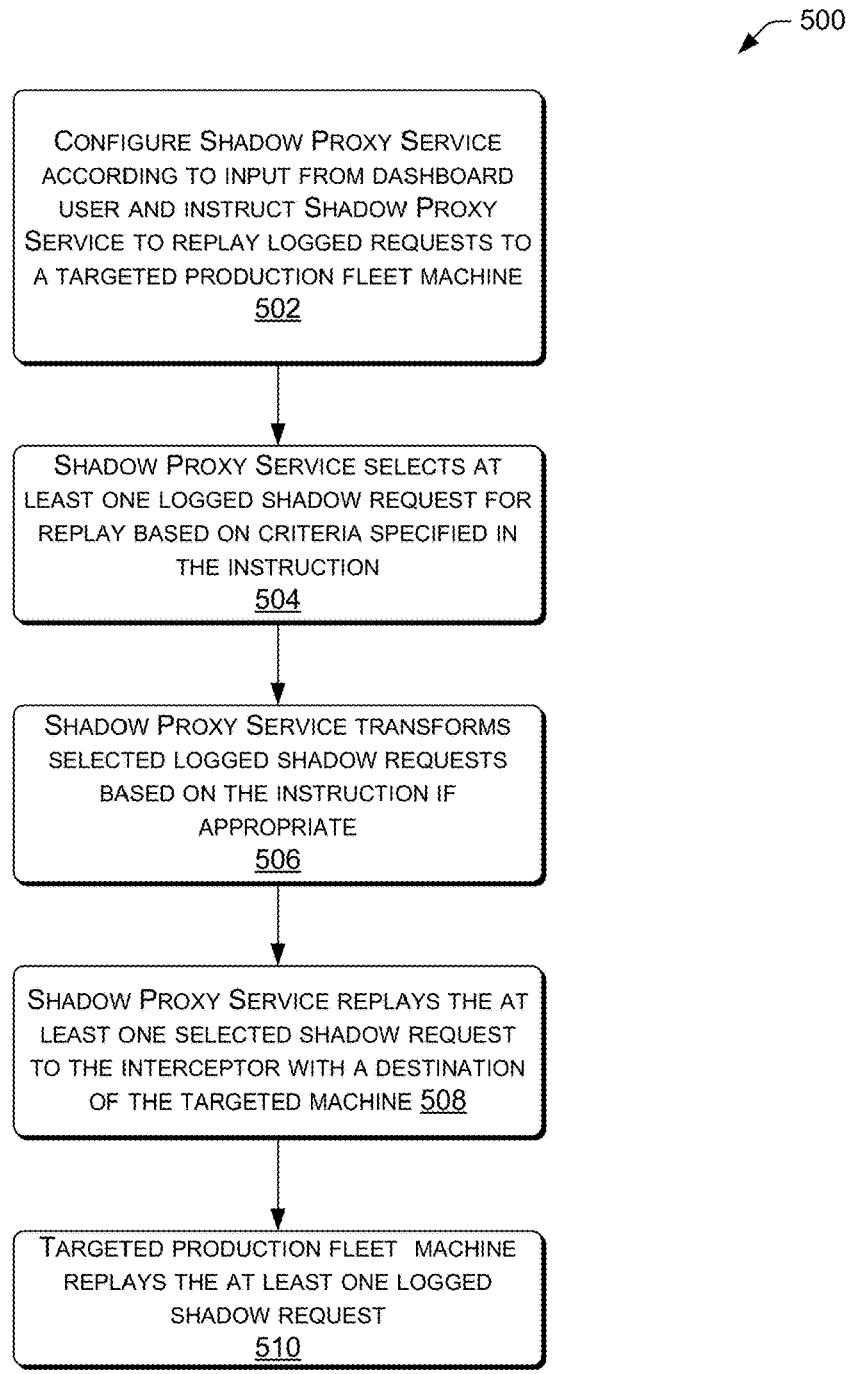
FIG. 5 is a flow diagram of an illustrative process to perform replay of logged requests to a production system.

FIG. 5 is a flow diagram of an illustrative process 500 that provides for replay of logged requests to one or more fleets as described above regarding FIGS. 1-3. In particular, process 500 illustrates an example process flow showing the operations of the dashboard service 122 and shadow proxy service 116, beginning with setting up the shadow proxy service 116 to replay requests to a targeted production fleet machine (or the production system in general). It should be noted that there is no requirement of a particular targeted production fleet machine. This is merely an example scenario used to aid in comprehension. For example, in the above-described situation of transitioning the production fleet 108 to a state that is prepared to handle a surge in movie and TV requests between the times of 8:00 p.m. and 10:00 PM, a plurality of production fleet machines are, or the entirety of the production fleet 108 is targeted by the replay requests.

At 502, the dashboard service 122 configures the shadow proxy service 116 according to input from, for example, a dashboard user. Once the shadow proxy service 116 is configured, the dashboard service 122 instructs the shadow proxy service 116 to begin replaying logged requests to a targeted production fleet machine based on the configuration. It should be noted that with regard to the control of the shadow proxy service 116 by the dashboard service 122, this is merely an example implementation. The dashboard service 122 is not required for the operation of the shadow proxy service 116 in all implementations. In other words, the shadow proxy service 116 may operate independently or exclusively of the dashboard service 122. For example, the shadow proxy service 116 may include logic or instructions to determine the configuration without input from the dashboard service 122. Alternatively, the shadow proxy service 116 may have an internal means by which users or other applications may configure its settings. In still further implementations, the shadow proxy service 116, the dashboard service 122, and interceptor 114 of the shadow proxy service system may be merged into a single device or application; or the various parts, modules, or the operations performed by the shadow proxy service 116, the dashboard service 122, and interceptor 114 may be reorganized amongst them. For example, the analysis module may be a component of the dashboard service 122 rather than the shadow proxy service 116.

At 504, the shadow proxy service 116 selects at least one logged shadow request for replay based on one or more criteria specified in the configuration and instructions. At 506, the shadow proxy service 116 transforms the selected logged shadow requests based on the configuration and instructions, if appropriate to the particular implementation.

At 508, the shadow proxy service 116 replays the at least one selected shadow request to the interceptor 114 with a destination of the targeted production fleet machine. At 510, the targeted production fleet machine replays at least one replay request 136 corresponding to the at least one selected logged shadow request.

As discussed above, there are various techniques which may be implemented to determine how many logged shadow requests are to be replayed to the targeted production fleet machine. The above process is not limited to any of these techniques.

Further, the techniques and systems described above are not limited by the details of the example implementations. For example, the warm-up procedures described above may be applied to warming of aspects other than the cache of production system machines. In a particular variation, the system may be used to warm-up the request processing of the Java virtual machine. When a machine is brought online, the Java virtual machine may not have loaded dependent objects and completed its initial compilation optimizations. These occur after a certain amount of request processing has been performed by the Java virtual machine. As such, the Java virtual machine of a production system machine may be "warmed up" using the above-described replay procedure and adapting the duration of the replay and selection request to be replayed accordingly.

Optimizing Shadow Proxy Service System

Figure 6:
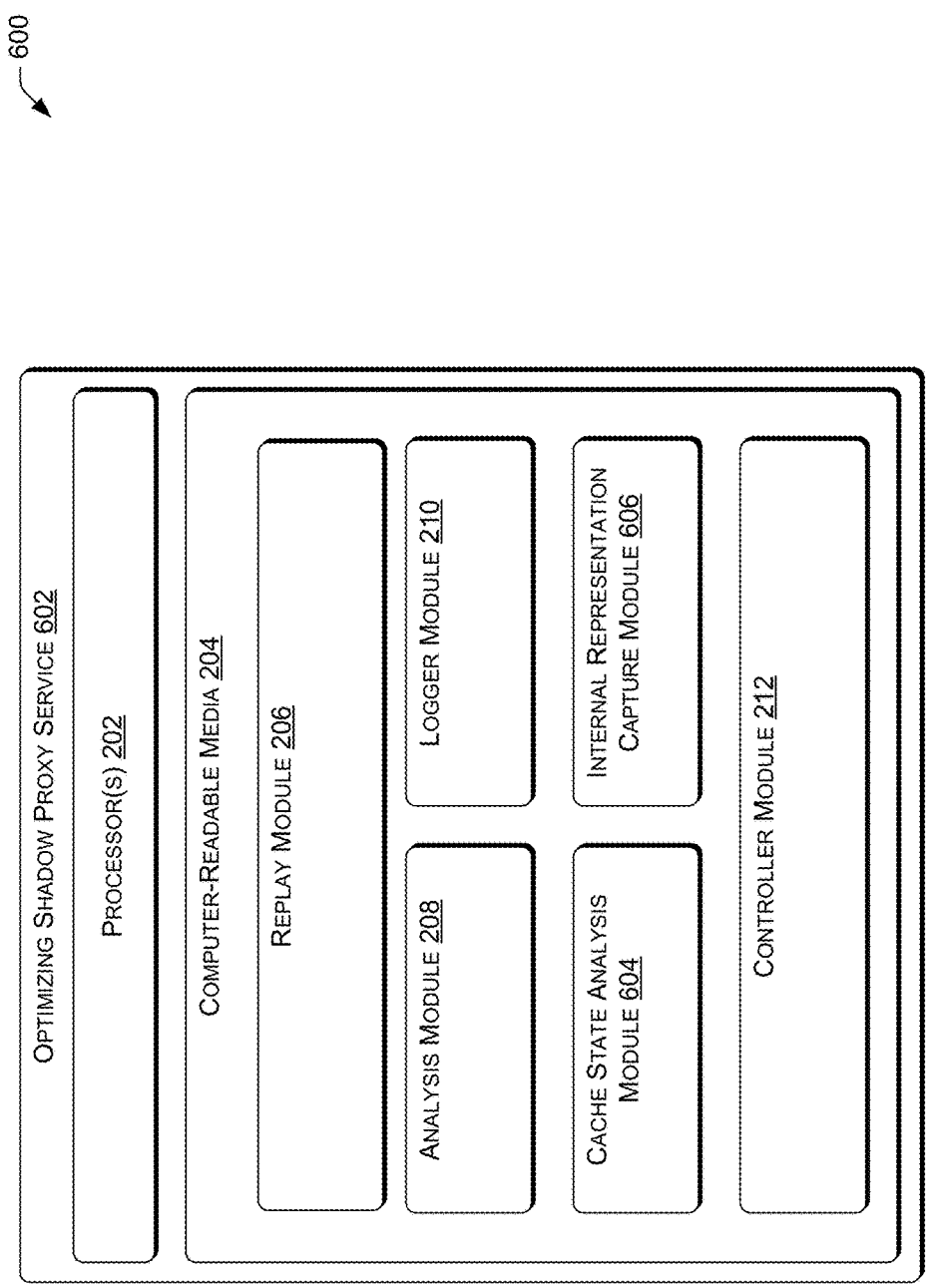
FIG. 6 is a schematic diagram of an illustrative environment that provides for replay of intercepted requests to a shadow fleet and development of an optimized caching scheme for inter-service communications in multi-service systems.

FIG. 6 is a schematic diagram of an illustrative computing architecture 600 of an example optimizing shadow proxy service 602 according to some implementations that may provide for replay of intercepted requests 128 to a shadow fleet, receive responses to the replayed requests, and develop an optimized caching scheme for inter-service communications. The operations of the optimizing shadow proxy service 602 may further provide for the determination of an internal system representation of production system data from an external representation of the system data and published the internal representation to the production system for consumption and utilization in the processing of production requests. The computing architecture 600 may be implemented in a distributed or non-distributed computing environment.

The computing architecture 600 may include one or more processors 202 and computer readable media 204 that stores various modules, applications, programs, or other data. The computer-readable media 204 may include instructions that, when executed by the one or more processors 202, cause the processors to perform the operations described herein for the shadow proxy service 602. In some embodiments, the computer-readable media 204 may store the replay module 206, the analysis module 208, the logger module 210 and the controller module 212 of the shadow proxy service 116. The computer readable media 204 may also store a cache state analysis module 604 and internal representation capture module 606 which may be utilized to perform the above-described additional functions of the optimizing shadow proxy service 602. The components may be stored together or in a distributed arrangement. The functions of the cache state analysis module 604 and internal representation capture module 606 are described in more detail below with regard to FIGS. 7-10.

Figure 7:
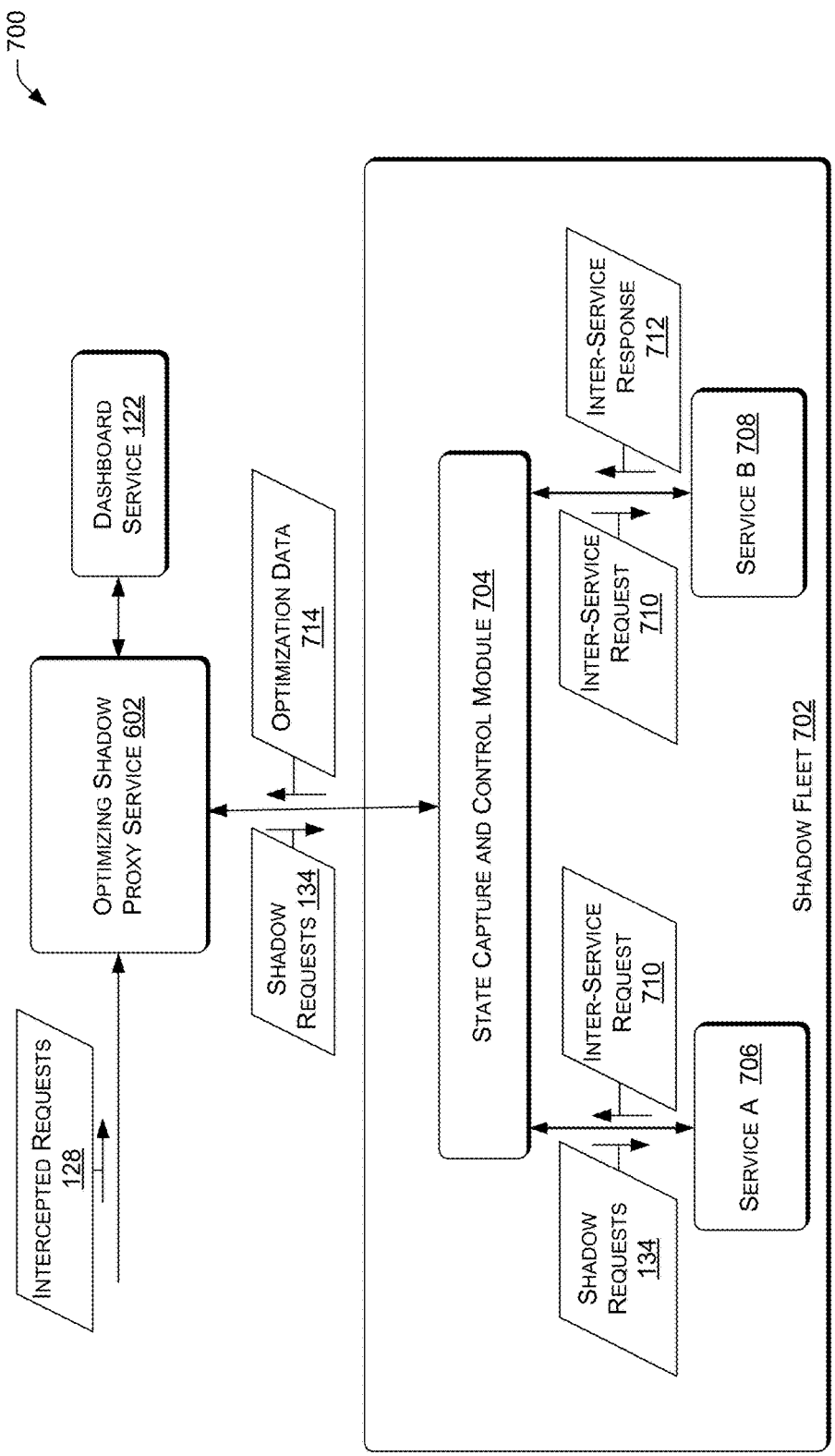
FIG. 7 is a schematic diagram of an illustrative environment that provides optimized caching schemes for inter-service request caching.

FIG. 7 is a schematic diagram of an illustrative environment 700 that provides for the use of an optimizing shadow proxy service system including an optimizing shadow proxy service 602 and a shadow fleet 702 operating a state capture and control module 704, a service A 706 and a service B 708. Specifically, an optimizing shadow proxy service system is another implementation of the shadow proxy service system discussed above regarding FIG. 1. As mentioned above, in some implementations, the shadow proxy service may be used to determine optimized caching schemes for inter-service request caching. FIG. 7 illustrates one such implementation.

In operation, the optimizing shadow proxy service 602 functions similarly to the shadow proxy service 116 to receive intercepted requests 128 that are intercepted by interceptor 114 and issues shadow requests 134 to shadow fleet 702. Unlike the scenario illustrated in FIG. 1, the shadow requests 134 issued by the optimizing shadow proxy service 602 in FIG. 7 are processed by multiple services to obtain optimization data that may include the shadow responses 138 and additional data such as intermediate states, and/or cached inter-service requests and inter-service responses.

The following is an example scenario in which such multi-service operations may occur. In the illustrated example, in a production version of the software, a service A 706 receives shadow requests 134 and interacts with a service B 708 through a caching module to produce the shadow responses 138. In FIG. 7, the shadow requests 134 are received by the state capture and control module 704 which impersonates the caching module of the production version of the software and acts as an intermediary and controller for service A 706 and service B 708. The state capture and control module 704 may replay the shadow requests 134 to service A 706. Service A 706 operates to generate an inter-service request 710 with a destination of service B 708 that requests additional processing be done by service B 708. Service A returns the inter-service request 710 along with information regarding the current state of service A 706 to the state capture and control module 704. The state capture and control module 704 stores the inter-service request 710, the current state of service A 706 and any other pertinent information. The state capture and control module 606 then forwards the inter-service request 710 to service B. As a result, service B 610 returns an inter-service response 712 to the state capture and control module 704 along with information regarding the current state of service B 708. The state capture and control module 606 forwards the inter-service response 712 to service A 706 and stores the inter-service response 712 and the state of service B and any other pertinent information. This continues until the shadow response 138 is generated. The information stored by the state capture and control module 704 is returned to the optimizing shadow proxy service 602 as the optimization data 714 along with the shadow response 138. Of course, the optimizing shadow proxy service 602 may also operate with regard to inter-service requests issued by service B 708 to service A 706.

The optimization data 714 returned to the optimizing shadow proxy service 602 may be utilized by the optimizing shadow proxy service 602 to determine an optimized caching scheme for inter-service requests between service A 608 and service B 610. An example implementation of such a process is discussed below with regard to FIG. 8.

While shown as another implementation of the shadow proxy service system, the functionality of the optimizing shadow proxy system 602 may be incorporated into the shadow proxy service 116. In other words, the shadow proxy service 116 could provide the functionality of the optimizing shadow proxy system 602.

Figure 8:
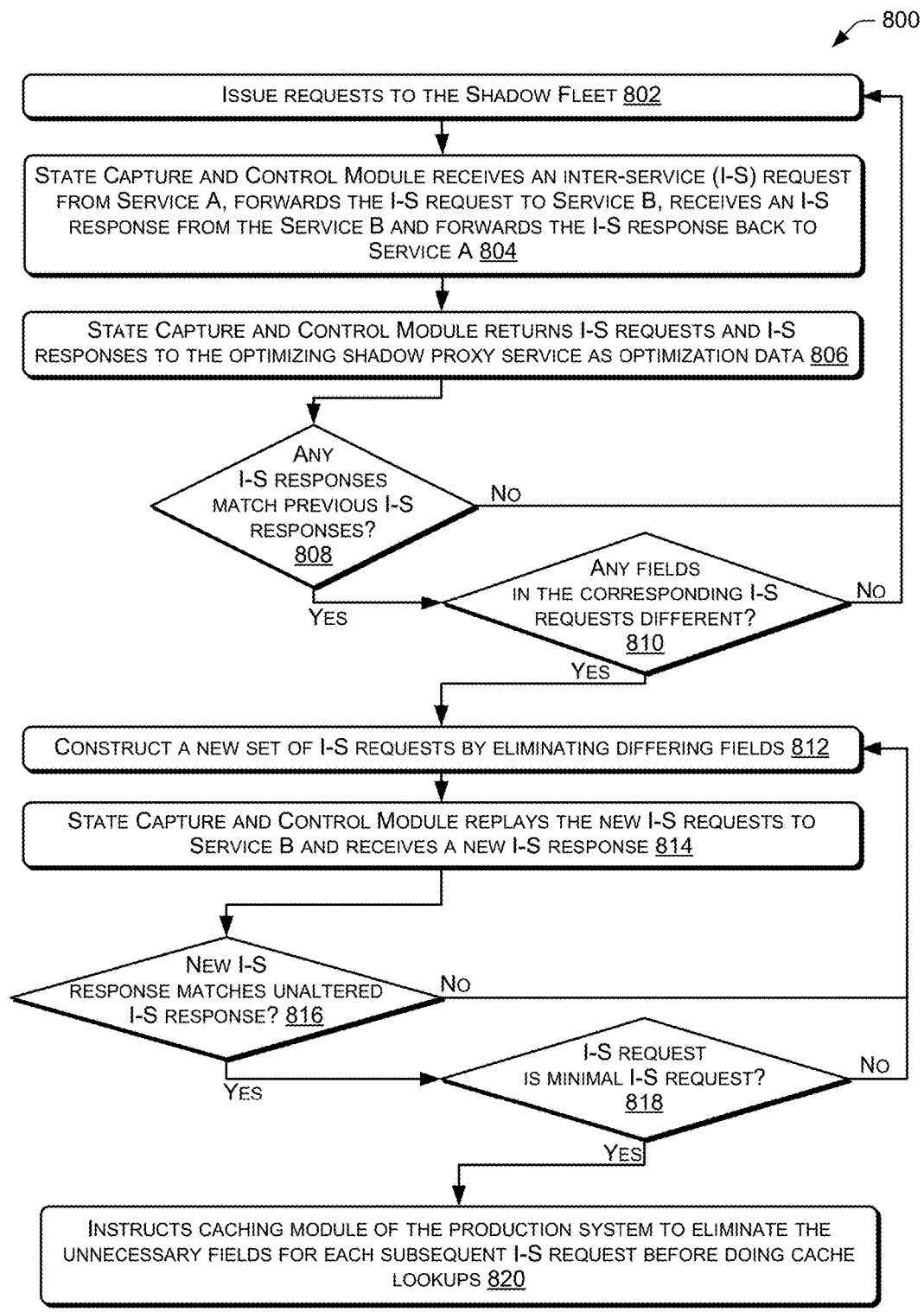
FIG. 8 is a flow diagram of an illustrative process to provide for the optimization of caching of requests between, for example, services of a multi-service production system.

FIG. 8 is a flow diagram of an illustrative process 800 that provides for the optimization of caching of requests between, for example, services of the production system 106. In particular, process 800 illustrates an example process flow showing the operations of the optimizing shadow proxy service 602 to optimize the caching of requests between the services beginning at the issuing of the instruction that the optimizing shadow proxy service 602 to replay the shadow requests 134 to the shadow fleet 604. Although discussed below in the context of the production system 106 and the optimizing shadow proxy service 602, one of ordinary skill in the art would recognize that the illustrative process 800 may be applied outside of this environment.

At 802, the optimizing shadow proxy service issues shadow requests 134 to the shadow fleet 604. At 804, the state capture and control module 606 of the software operating on the shadow fleet 604, acting as in an intermediary capacity, receives and caches inter-service requests from a client service (e.g., Service A) and forwards the inter-service requests to a target service (e.g., Service B). The state capture and control module 704 receives inter-service responses from the target service (e.g., Service B) and forwards the inter-service responses back to the requesting client service (e.g., Service A).

At 806, the state capture and control module 704 returns the inter-service requests and the corresponding inter-service responses as optimization data 612 to the optimizing shadow proxy service 602 along with the shadow responses 138.

At 808, the cache state analysis module 604 operates to analyze the inter-service request/response pairs and compares the inter-service responses to previous inter-service responses. If a received inter-service response matches a previous inter-service response, the process continues to 810. Otherwise, if the received responses do not match any previous responses, the process returns to 812.

At 810, the cache state analysis module 604 determines if any fields in the inter-service requests differ. If any fields differ, the process continues to 812. Otherwise, if the matched requests do not differ, the process returns to 802.

At 812, the cache state analysis module 702 constructs a new set of inter-service requests by eliminating differing fields in the inter-service requests (e.g., one field at a time), and instructs the state capture and control module 606 to replay the new inter-service request to Service B 708 (assuming Service B 708 was the responding party) to see if the new inter-service response received from service B 708 continues to matches the original inter-service response(s).

At 814, the state capture and control module 704 replays the newly constructed inter-service requests to the service B 708 and receives new inter-service responses.

At 816, the cache state analysis module 604 determines if the new inter-service response matches the unaltered inter-service response. If so the process continues to 818. Otherwise, the process returns to block 812.

At 818, the cache state analysis module 604 determines if the inter-service request is a minimal inter-service request. In some implementations, the determination of whether the inter-service request is minimal may be based on whether the altered inter-service request contains fields have not been tested for removal that still differed in the unaltered inter-service requests with matching responses. In other words, if there field in the unaltered requests that had matching responses which the process has not attempted to remove to determine if the resulting response continues to match, the process continues. Of course, the above example of a determination of whether an inter-service request is minimal is provided as an example only and is not limiting. For example, in other implementations, the minimization steps of FIG. 8 may continue by also attempting to eliminate fields in the unaltered requests that match. This and other variations on the minimization of the inter-service requests would be apparent to one of ordinary skill in the art in view of this disclosure. If it is determined that the inter-service request is minimal, the process continues to 820. Otherwise, the process returns to block 812.

At 820, the optimizing shadow proxy service 602 instructs the caching module of the production system software 106 to eliminate the unnecessary fields (i.e., the fields that were eliminated in 812 and whose removal was found not to impact the response at 816) for each subsequent inter-service request prior to doing a cache lookup (and caching the inter-service request).

While described above in the context of an external system such as the optimizing shadow proxy service 602, the above-described functionality of the optimizing shadow proxy system 602 and the state capture and control module 704 may be partially or completely incorporated into the production system software directly rather than performed by an external system. In other words, the aforementioned caching module that may operate as an intermediary between service A 706 and service B 708 in the production system software may perform the above-described operations. Other variations would be apparent to one of ordinary skill in the art in view of this disclosure.

Figure 9:
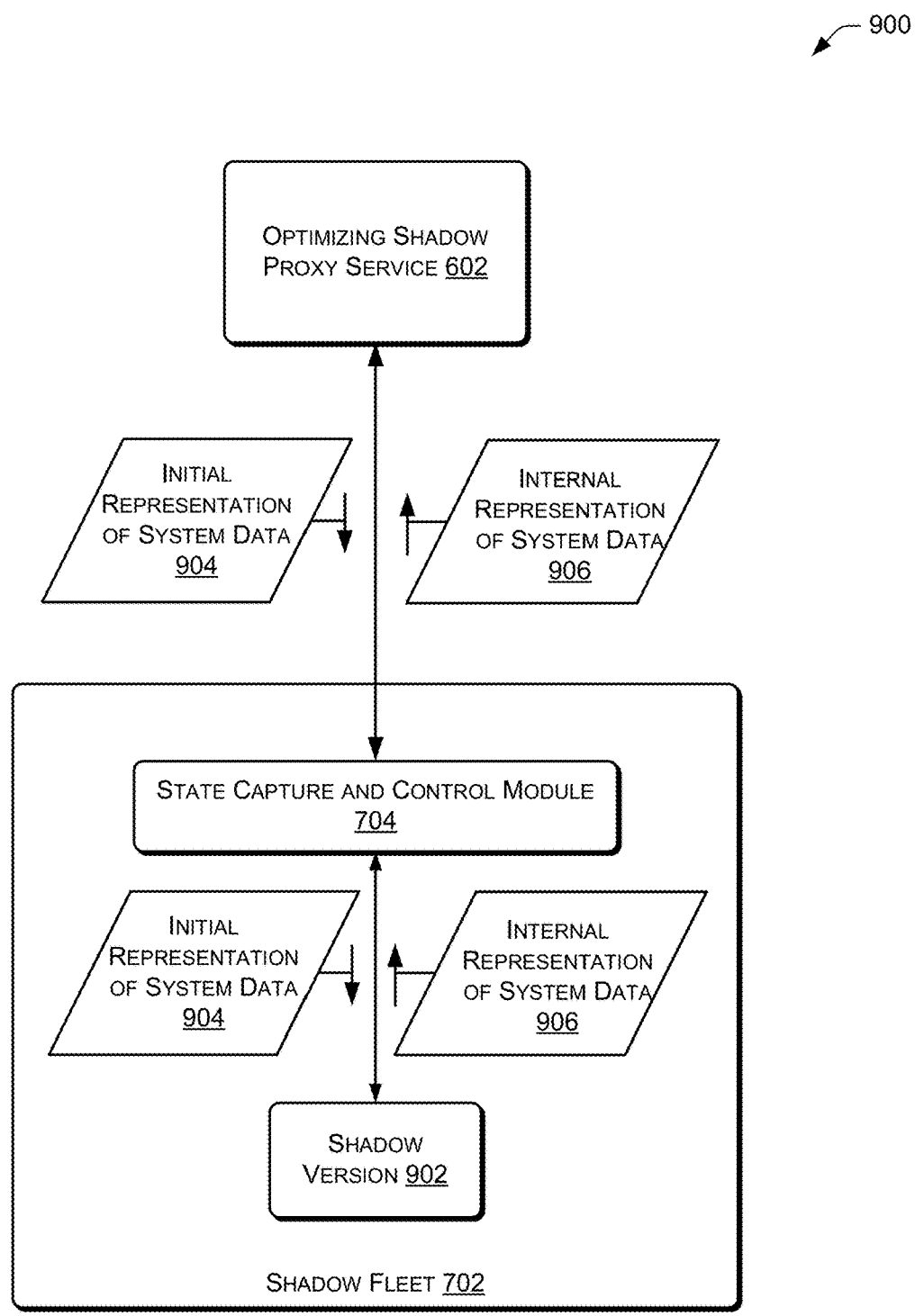
FIG. 9 is a schematic diagram of an illustrative environment that provides for the transformation of external representations of production system data into the internal representation utilized by the production system software.

FIG. 9 is a schematic diagram of an illustrative environment 900 that provides for the use of an optimizing shadow proxy service system including an optimizing shadow proxy service 602 and a shadow fleet 702 operating a state capture and control module 704 and a shadow version 902 of the production software. Specifically, FIG. 9 illustrates another previously mentioned use of the shadow proxy system to the process of external representations of production system data 112 into the internal representation utilized by the production system software such that the production system 106 is not required to perform this function. The optimizing shadow proxy service 602 may further publish the internal representation of the system data 112 to the production system 106 for storage as the production system data 112. The production system data 112 may then be utilized by the production fleet 108 and production controller 110 in the processing of production requests 126.

In operation, the optimizing shadow proxy service 602 may function similarly to the shadow proxy service 116 to receive intercepted requests 128 that are intercepted by interceptor 114 and issues shadow requests 134 to shadow fleet 702. Unlike the scenario illustrated in FIG. 1, the function of interest in FIG. 9 is not the processing of shadow requests 134, but the transformation of an initial representation of system data 904 presented to the production system 106 into an internal representation of the system data 906 which can be utilized by the production system software internally. For example, in an e-commerce system, various system data, such as tax rules for different jurisdictions are regularly updated and moved in and out of memory of the production fleet machines as the machines process various production requests 122 that call for different sets of rules. In some systems, when a set of rules which is not in cache is needed to process a production request 122, the set of rules is loaded from storage in an external representation that is not native to the software of the production system 106. In such a case, the production system software must transform the set of rules from the external representation to an internal representation that is used in the software natively. Sometimes, a delay results from the time required to load the external representation of the rules and transform the rules into the internal representation. This delay impacted the satisfaction of users of the e-commerce systems. To alleviate this problem, some implementations utilize the optimizing shadow proxy service 602 to pre-transform the external representation of the rules or other system data into either the internal representation utilized by the software or a form that is more easily consumed by the software (i.e., transformed into the internal representation). Accordingly, in some implementations, system data (such as rule files) may be configured and deployed to the production system using the shadow proxy service 602 in this manner.

In operation, the optimizing shadow proxy service 602 receives the initial representation of the system data 904 from, for example, the production controller 110, such as in a request for the optimizing shadow proxy service 602 to transform the initial representation into a more consumable form. The optimizing shadow proxy service 602 outputs the initial representation of the system data 904 to the shadow fleet 702, and, more particularly, to the state capture and control module 704. The state capture and control module 704 outputs the initial representation of system data 904 to the shadow version 902 of the software along with an indication that the shadow version 902 is to return the internal representation of the system data 906. As mentioned previously, the shadow version of the software may be selectively compiled to include code that will output the internal representation of various system data. Upon receiving the initial representation of the system data 904, the shadow version 902 converts the initial representation 904 into the internal representation of the system data 906. The shadow version 902 then returns the internal representation 906 to the state capture and control module 704. In turn, the state capture and control module 704 returns the internal representation 906 to the optimizing shadow proxy service 602. The optimizing shadow proxy service 602 returns the internal representation of the system data 906 to the production system 106. More particularly, the optimizing shadow proxy service 602 may store the internal representation of the system data 906 in the production system data 112 and notify the production controller 110 of the availability of the internal representation of the system data 906. The production controller 110 may inform a production fleet machines that the internal representation of the system data 906 is available for use in processing production requests 126 when the production fleet machines subsequently makes a request for the corresponding system data.

While the above description of FIG. 9 is in the context of specific implementation, the system and techniques may be generalized. For example, as discussed above, the converted representation of the system data meets the various forms. Examples of such converted forms include machine-readable representations such as JSON, XML and an actual binary representation that matches the operating system of the target production fleet machine. In the case of JSON and XML, n-ary tree data of, for example, system data specifying rules or a decision tree may be serialized into JSON or XML using an appropriate serializer.

Figure 10:
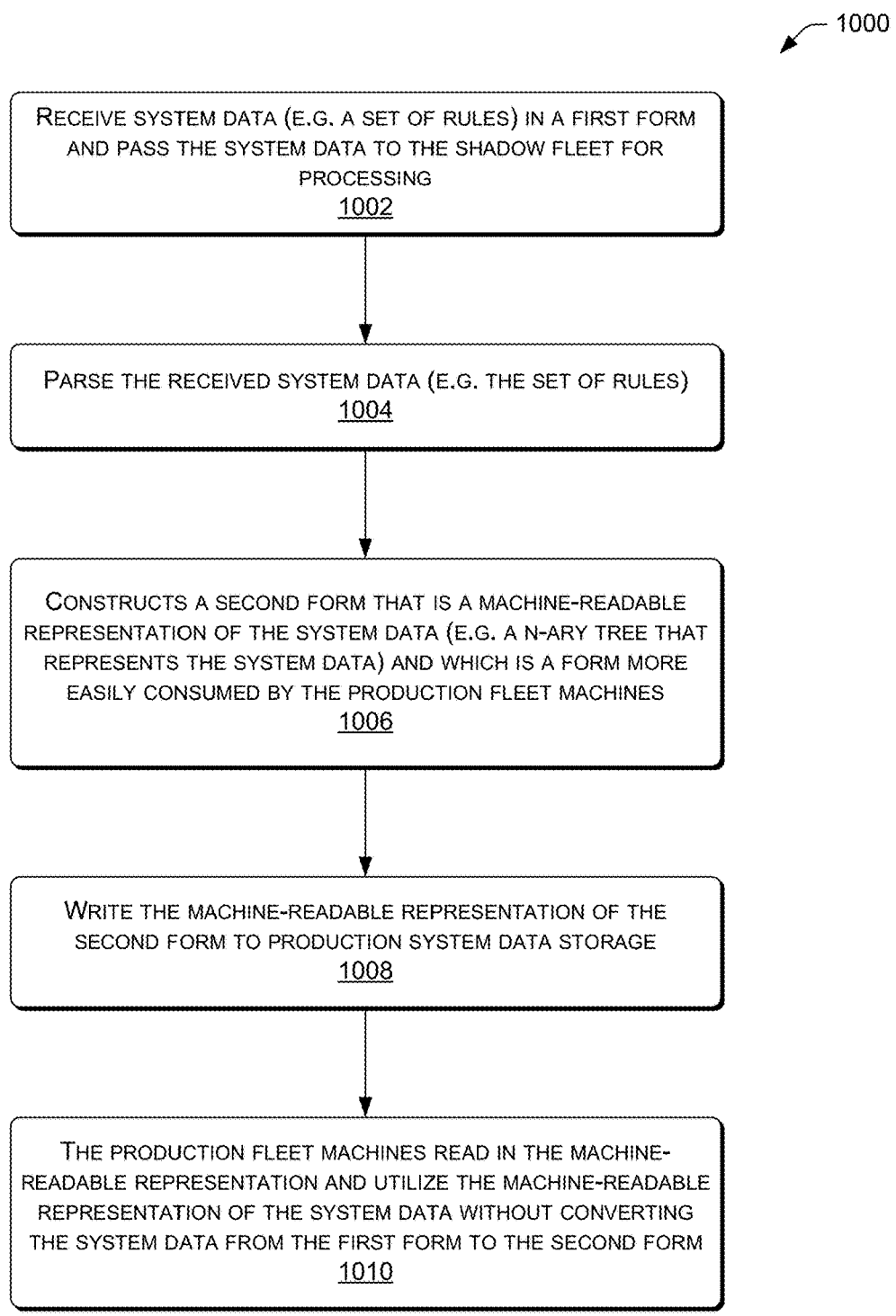
FIG. 10 is a flow diagram of an illustrative process to provide for the transformation of system data from a first form, such as an external representation of the system data, into a second form, such as the internal representation of the system data utilized by the production software or a representation of the system data that is more readily consumable by production system software than the external representation.

FIG. 10 is a flow diagram of an illustrative process 1000 that provides for transformation of system data from a first form, such as an external representation of the system data, into a second form, such as the internal representation of the system data utilized by the production software or a representation of the system data that is more readily consumable by the production software than the external representation thereof. As described above, these functions may be performed by the optimizing shadow proxy service 602 in conjunction with the shadow fleet 702. It should be noted that there is no requirement for the use of the shadow proxy service system to perform these functions. The use of the shadow proxy service 602 to perform these functions is merely provided as an example for ease of understanding. An alternative implementation in which a "specialized" application is used to perform these and/or similar functions is discussed below with respect FIGS. 12 and 13.

At 1002, the optimizing shadow proxy service 602 receives system data in a first form, such as a set of tax rules for processing production requests in a form provided by a business department of an e-commerce company. An example of such a first form may be a spreadsheet. The optimizing shadow proxy service 602 may pass the system data to the shadow fleet 702 for processing. More particularly, the optimizing shadow proxy service 602 may pass the system data to the state capture and control module 704 which in turn instructs the shadow version 902 to transform the system data and return the internal representation of the system data.

At 1004, the shadow version 902 parses the received system data. At 1006, the shadow version 902 constructs a second form of the system data that may be a machine-readable representation of the system data and/or is in a form more easily consumed by the production fleet machines. An example of the second form may be JSON or XML data that includes an n-ary tree that represents a decision tree of rules (i.e. the system data). As mentioned above, the second form may be the specific internal representation format used by the software for this system data.

At 1008, the optimizing shadow proxy system 602 receives the second form of the system data from the shadow fleet 702 and writes the second form of the system data to the production system data 112. In some implementations, the optimizing shadow proxy system 602 may inform the production controller 110 that the second form of the system data it is available for utilization by the production system 106.

Subsequently, at 1010, when the production fleet machines request the system data, the production fleet machines read in or receive the second form in the machine readable representation and utilize the machine readable representation of the system data without needing to convert the system data from the first form to the second form.

While described above in the context of an optimizing shadow proxy service 602 (e.g. a particular service), the above-described functionality of the optimizing shadow proxy service 602, cache state analysis module 604 and the internal representation capture module 606 may be implemented as a multiple services rather than as a combined service. An example of such an implementation is illustrated FIG. 11.

Figure 11:
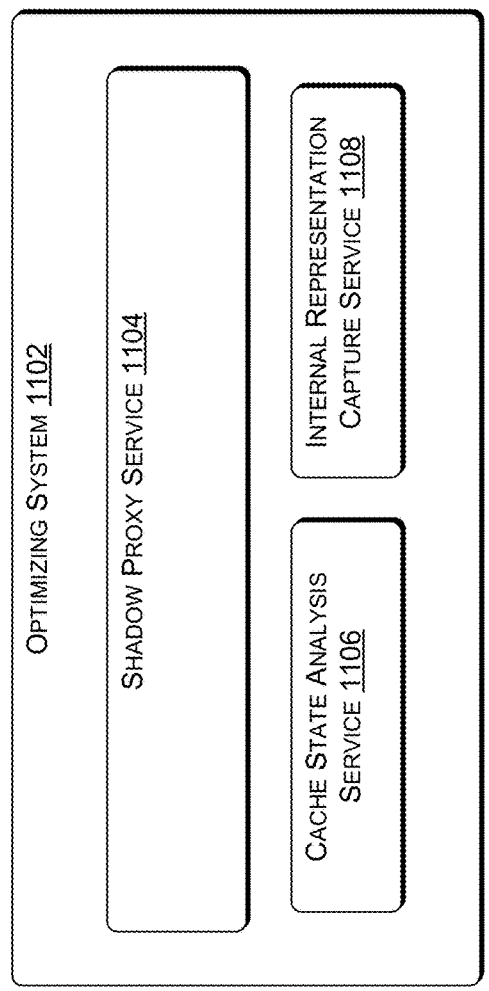
FIG. 11 is a schematic diagram of an illustrative environment that provides for replay of intercepted requests to a shadow fleet, determination of an internal representation of system data, and development of an optimized caching scheme for inter-service communications in multi-service systems.

Specifically, FIG. 11 provides a schematic diagram of an illustrative environment 1100 including an example optimizing system 1102 according to some implementations that may provide for replay of intercepted requests 128 to a shadow fleet, receive responses to the replayed requests, and develop an optimized caching scheme for inter-service communications. The operations of the optimizing shadow proxy service 602 may further or instead provide for the determination of an internal system representation of production system data from an external representation of the system data and published the internal representation to the production system for consumption and utilization in the processing of production requests.

The optimizing system 1102 may include the shadow proxy service 1104, the cache state analysis service 1106 and an internal representation capture service 1108. The operations of the shadow proxy service 1104 may correspond to the operations of the shadow proxy service 116 but include the functionality to interact with and operate according to the instructions of the cache state analysis service 1106 and internal representation capture service 1108.

In particular, in the implementation illustrated FIG. 11 the cache state analysis service 1106 and the internal representation capture service 1108 perform similar functions to the cache state analysis module 604 and internal representation capture module 606 but utilize calls to the shadow proxy service 1104 to interact with, for example, the shadow fleet 702 as shown and described with regard to FIGS. 7-10.

Figure 12:
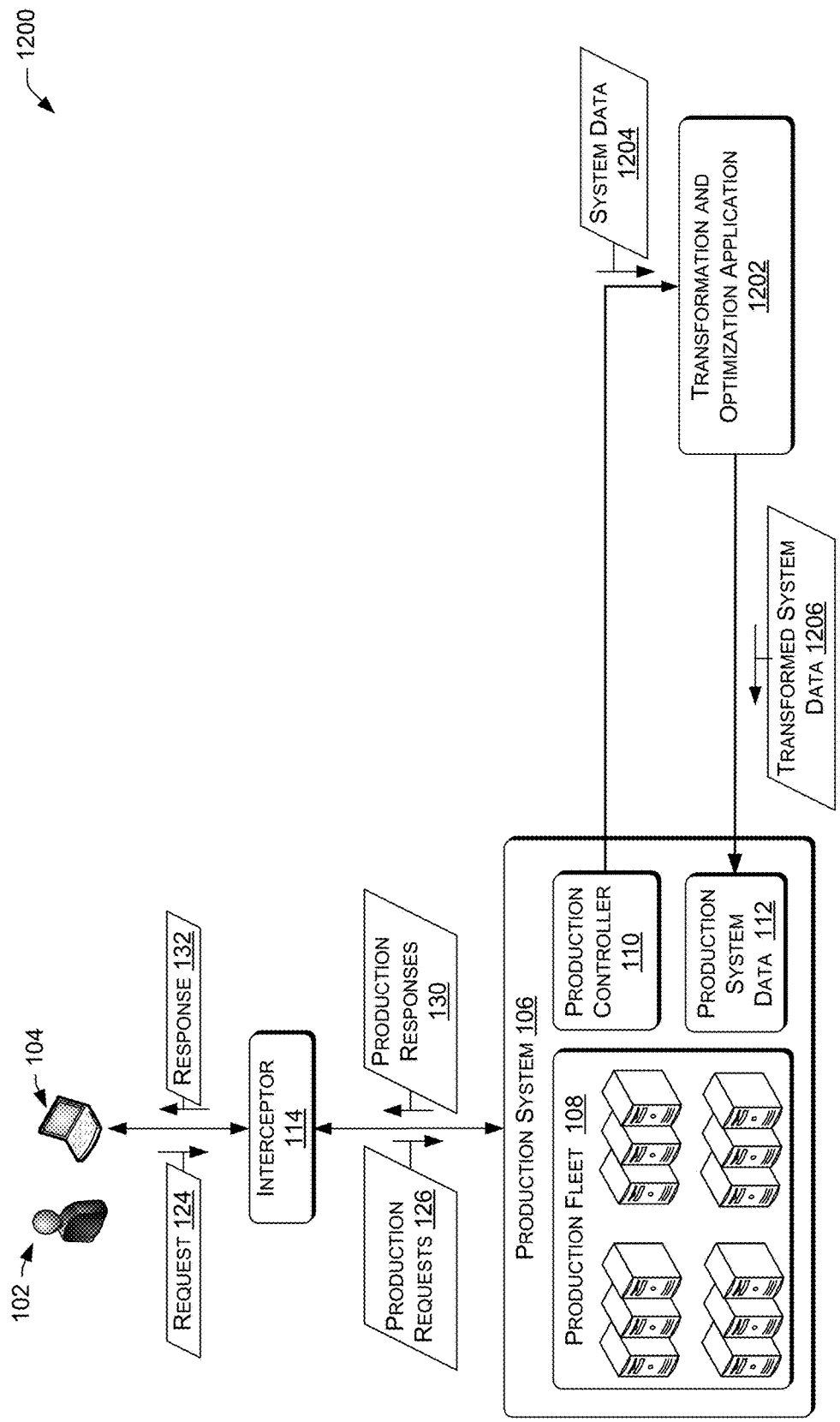
FIG. 12 is a schematic diagram of an illustrative environment that provides a transformation and optimization application that processes a external representation of production system data into an internal representation utilized by the production system software such that the production system is not required to perform this function.

FIG. 12 is a schematic diagram of another illustrative environment 1200 that provides processing of external representations of production system data 112 into the internal representation utilized by the software such that the production system 106 is not required to perform this function. As previously mentioned, FIG. 12 illustrates an alternative implementation in which the functions of the shadow proxy service 602 discussed above with regard to FIGS. 9 and 10 are performed by a transformation and optimization application 1202.

In operation, when new system data 1204 is provided to the production controller 110 in a form that is costly for the production fleet machines to utilize such that the production fleet machines generally operate to transform the system data 1204 into a transformed system data 1206 that is directly usable or more easily consumed, the production controller 110 provides the system data 1204 to the transformation optimization application 1202 to execute such a transformation. In response, transformation and optimization application 1202 transforms the system data 1204 into transformed system data 1206 which is a form that is more easily consumed by the production fleet machines and, in some implementations, may be a form that is native to the software of the production system 106. The transformation and optimization application 1202 may then publish the transformed system data 1206 to the production system 106 for storage as production system data 112. The production system data 112 may then be utilized by the production fleet 108 and production controller 110 in the processing of production requests.

Figure 13:
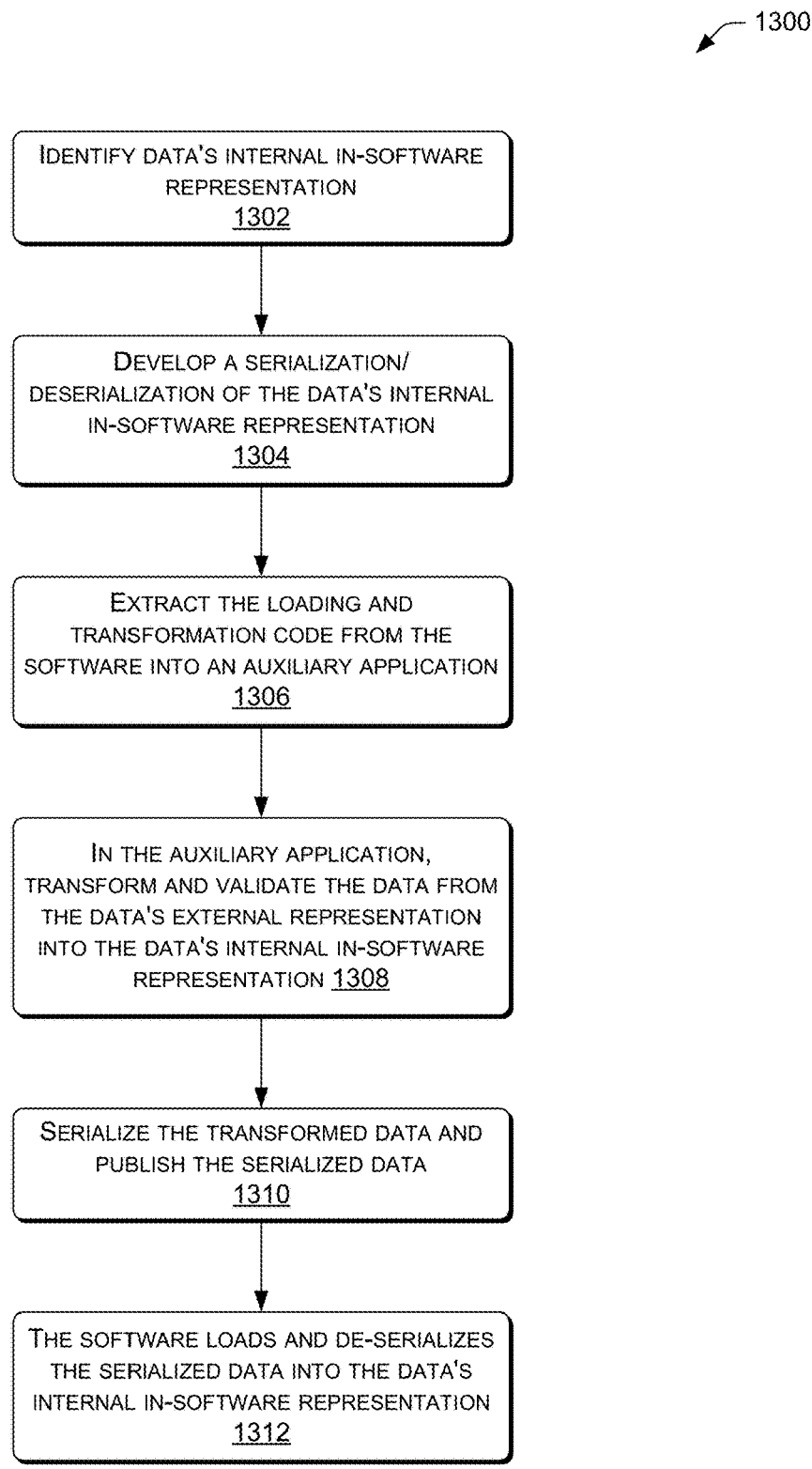
FIG. 13 is a flow diagram of an illustrative process to provide for the transformation of system data by an auxiliary application from a first form into a second form.

FIG. 13 is a flow diagram of an illustrative process 1300 that provides for transformation of system data by an auxiliary application from a first form, such as an external representation of the system data, into a second form, such as the internal representation of the system data utilized by the production software or a representation of the system data that is more readily consumable by the production software than the external representation.

At 1302, the data's internal in-software representation is identified. As discussed previously, in some implementations, the code of the software may be instrumented so as to output an indication of the internal form taken by the data. However, implementations are not so limited and, in some implementations, the internal in-software representation of the data may be identified using other techniques, processes, and/or methods. For example, in some implementations, the internal in-software representation of the data may be determined by a user of the system or the developer of an auxiliary application, (e.g. the transformation and optimization application 1202).

At 1304, a serialization/deserialization procedure of the data's internal in-software representation may be developed. As with the identification of the data's internal representation, this process may be performed by one or more general purpose computers. In some implementations, techniques, such as machine learning, may be utilized to derive the serialization/deserialization of the internal in-software representation of the data. However, in other implementations, the determination of the serialization/deserialization scheme for the data's internal in-software representation may be performed by a user.

At 1306, the loading and transformation code of the software is extracted and the extracted code and the code implementing the serialization of the data's internal in-software representation are integrated into an auxiliary application. As with 1302 and 1304, 1306 may be performed by a computer program with machine executable instructions or by a developer of the auxiliary application. Once the code is integrated, the auxiliary application is prepared to transform the system data from the external representation into the internal representation used by the production software (or a form that is more easily consumed by the production software).

At 1308, new system data in the external representation is provided to the auxiliary application (e.g. system data 1204 being provided to the transformation and optimization application 1202 in FIG. 12). The auxiliary application transforms the system data (e.g. system data 1204) from its initial form, such as its external representation, into an optimized form, such as the form of the data that is used internally by the production software or a form which is more easily consumed by the production software. The optimized form is then validated.

At 1310, the auxiliary application serializes the transformed and validated data and publishes the serialized data to the production system (e.g. transformed system data 1206 shown in FIG. 12 being provided to the production system 106 by the transformation and optimization application 1202).

At 1312, the production software loads the serialized transformed data 1206 and utilizes the deserialization procedure to deserialize the serialized transformed data into the data is internal in-software representation. At this point, the production system may utilize the data normally. In some implementations, the deserialization procedure may be incorporated into a newly compiled version of the production software at the time the auxiliary application is introduced. In other implementations, the deserialization process (and hence the serialization process) may be predetermined and included in the production software as a general matter.

While the above discussion makes reference to the specific details such as the data's internal representation, some implementations may not include these details as one of ordinary skill in the art would understand in view of this disclosure. For example, FIGS. 9-10 and 12-13 were described such that the transformed data was published to the production system after being determined from the external representation of the system data. In some implementations, the production system may request the transformed data periodically and/or aperiodically. For example, a service agreement may provide that the production system may request an updated version of the transformed data every hour. Many other variations on the techniques and systems described herein be apparent to one of ordinary skill the art in view of this disclosure.

In one example variation, the system data 1204 may be provided to the production system 106 as a relational database. Certain types of queries run slow depending on the structure of the database. Indexes can help improve performance but key-value pair-based storage can provide for an optimized look-up of data. In some implementations, this can be accomplished as follows.

Every period of time, for example, a period defined in a service level agreement for the publishing the transformed system data 1206, the transformation and optimization application 1202 transforms the relational database containing system data 1204 into a database in which the relational database data is converted to key-value pairs. In some implementations, the values in the key-value pairs may be represented by JSON or XML and/or the key-value pair database may be read-only. The transformation and optimization application 1202 may then publishes published the transformed system data (the key-value pair database) to all consumers of the system data, or the consumers of the system data may pull the new transformed system data 1206. This allows for the production system machines to perform fast lookups for cases where a specific key can be constructed based on data the production system machine has (e.g., data included in a production request). The format of the key may be based on pre-processing of the system data 1204.

One example of this in an electronic commerce setting is a query for gift orders a customer placed in 2011. This query in "SQL" has a "where" clause that matches on the following fields: customer id, year, and an is-gift attribute. The transformation and optimization application 1202 may construct a database where the key is customer-id+year+is-gift, and the value for each key is a list of orders which match the fields of the key. This allows for an optimized lookup of information in the system data 1204.

In addition, the consumers of the system data 1204 may have two copies of the system data 1204 that a given time. In other words, the consumers of the system data 1204 will have an in-use copy of the system data 1204 and will receive a new copy of the system data 1204. At a given time interval or timestamp, the system may swap to using the newest version of the system data 1204.

The advantages that may be provided by the above described variant are that such a variant may decouple the production system operationally from the relational database that provides the system data 1204. Also, this variant may provide a key-pair database that does not require a network call to query. Further, while the production system 106 may still be dependent on the system that transforms and publishes the system data 1204 for updates, if the transformation and publication system fails, the production system 106 that consumes the system 1204 data may still operate using the older system data 1204 rather than failing altogether.

While the above discussion of FIGS. 9-10 and 12-13 referred to the utilization of the transformed system data in the context of replacing current system data, implementations are not limited to this use. For example, in some implementations, the transformed system data may be compared to the version of the system data currently being used by the production system for a variety of reasons. In one such implementation in which the production system includes multiple services each having a different production system data storage, each service receiving the transformed system data may perform the comparison to determine whether the transformed system data includes changes that are applicable to the particular service. In a more specific example, an e-commerce system may include a billing service and a shipping service. In such an example system, the transformed system data may only include updates that are applicable to the billing service and not the shipping service. Accordingly, by performing the comparison, the shipping service may determine that the current system data being utilized by the shipping service does not need to be updated. Avoiding such an unnecessary update may provide more efficient operation of such a service. Another utilization of the transformed system data may include verifying the transformed system data by executing shadow requests against the transformed system data within the shadow proxy system prior to replacing the current system data. Of course, other utilizations of the transformed system data are possible and such variations on the techniques and systems described herein would be apparent to one of ordinary skill the art in view of this disclosure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A computer-implemented method for use with a production system having first computing resources and second computing resources, the method comprising:
intercepting, asynchronously and without blocking, at least some production requests directed to the production system while the first computing resources are in an on-line mode of operation to generate intercepted production requests, a production request being a request for production system data from the production system;
logging the intercepted production requests as logged shadow requests;
selecting at least some of the logged shadow requests as selected shadow requests;
requesting the second computing resources to process, while in an off-line mode of operation and without modifying the production system data, the selected shadow requests; and
requesting the second computing resources to process additional shadow requests for replay as replayed shadow requests until one or more conditions regarding the replayed shadow requests is satisfied, wherein the replayed shadow requests include a mix of use cases to control a warm-up duration for the second computing resources;
wherein the selected shadow requests prepare a cache of the second computing resources to reduce start-up delay of the second computing resources for a subsequent on-line mode of operation.

2. The computer-implemented method as recited in claim 1, further comprising:
determining an aggregate mix of use cases of software of the production system exercised by the logged shadow requests,
wherein the requesting the second computing resources to process additional shadow requests is performed at least until at least one condition regarding the aggregate mix of use cases of the software exercised by the replayed shadow requests is satisfied.

3. The computer-implemented method as recited in claim 1, wherein the production system comprises a plurality of computing resources, and the computer-implemented method further comprising:
  requesting the production system to process the additional shadow requests until an indication regarding a cache of at least one computing resource indicates the at least one computing resource of the plurality of computing resources has cache contents related to production requests received by at least one other computing resource.

4. The computer-implemented method as recited in claim 1, wherein the production system comprises a plurality of computing resources, the computer-implemented method further comprising:
  requesting the production system to process the additional shadow requests until an indication regarding a cache of at least one computing resource of the plurality of computing resources indicates the at least one computing resource has cache contents related to predicted production requests related to an upcoming event.

5. The computer-implemented method as recited in claim 1, further comprising:
  classifying the logged shadow requests based on one or more criteria, the one or more criteria including at least a time of day criterion; and
  wherein selecting the at least some of the logged shadow requests is based on the time of day criterion.

6. The computer-implemented method as recited in claim 1, wherein the logged shadow requests are:
  stored in a data store in which each logged shadow request stored in the data store is labeled with a unique identification (ID) and that utilizes an index to the unique ID to retrieve logged shadow requests.

7. The computer-implemented method as recited in claim 1, wherein:
  the production system comprises a plurality of computing resources; and
  requesting the production system to process the additional shadow requests continues until an indication regarding a cache of at least one of the computing resources indicates the at least one of the computing resources has cache contents related to production requests received at a time of day similar to a previous time of day.

8. The computer-implemented method as recited in claim 1, wherein:
  the production system comprises a plurality of computing resources; and
  requesting the production system to process the additional shadow requests continues until an indication regarding a cache of at least one of the computing resources indicates the at least one of the computing resources has cache contents related to predicted production requests related to a predicted upcoming surge in a type of production request traffic.

9. The computer-implemented method as recited in claim 1, further comprising:
  classifying the logged shadow requests based on one or more criteria, the one or more criteria including at least a type of event criterion; and
  wherein selecting the at least some of the logged shadow requests is based at least on the type of event criterion.

10. A computer-implemented method comprising:
  intercepting, asynchronously and without blocking, at least some production requests directed to a production system to generate intercepted production requests, the production system comprising a plurality of production machines, while a first production machine of the production system is in an on-line mode of operation, a production request being a request for production system data from the production system;
  logging the intercepted production requests as logged shadow requests;
  selecting at least some of the logged shadow requests as selected shadow requests;
  requesting a second production machine of the production system to process the selected shadow requests while in an off-line mode of operation and without modifying the production system data; and
  requesting the second production machine to process additional shadow requests until one or more conditions regarding the additional shadow requests is satisfied, wherein the additional shadow requests include a mix of use cases to control a warm-up duration for the second production machine; and
  wherein the selected shadow requests prepare a cache of the second production machine to reduce start-up delay of the second production machine for a subsequent on-line mode of operation.

11. The computer-implemented method as recited in claim 10, further comprising:
  determining an aggregate mix of use cases of software exercised by the selected shadow requests;
  wherein the requesting the production system to process additional shadow requests is performed at least until at least one condition regarding the aggregate mix of use cases of the software exercised by the selected shadow requests is satisfied.

12. The computer-implemented method as recited in claim 10, wherein:
  requesting the second production machine to process the additional shadow requests continues until an indication regarding the cache of the second production machine indicates the second production machine has cache contents related to production requests being received by at least one other production machine.

13. The computer-implemented method as recited in claim 10, wherein:
  requesting the second production machine to process the additional shadow requests continues until an indication regarding the cache of the second production machine indicates that the second production machine has cache contents related to predicted production requests related to an upcoming event.

14. The computer-implemented method as recited in claim 10, further comprising:
  classifying the logged shadow requests based on one or more classification criteria, wherein the one or more classification criteria include at least a time of day criterion; and
  wherein selecting the at least some of the logged shadow requests is based at least on the time of day criterion.

15. The computer-implemented method as recited in claim 10, wherein the logged shadow requests are stored in a data store in which each logged shadow request stored in the data store is labeled with a unique identification (ID) and that utilizes an index to the unique ID to retrieve logged shadow requests.

16. The computer-implemented method as recited in claim 10, wherein:
  requesting the second production machine to process the additional shadow requests continues until an indication regarding the cache of the second production machine indicates the second production machine has cache contents related to production requests received at a time of day similar to a previous time of day.

17. The computer-implemented method as recited in claim 10, wherein:
requesting the second production machine to process the additional shadow requests continues until an indication regarding the cache of the second production machine indicates that the second production machine has cache contents related to predicted production requests related to a predicted upcoming surge in a type of production request traffic.

18. The computer-implemented method as recited in claim 10, further comprising:
classifying the logged shadow requests based on one or more criteria, wherein the one or more criteria include at least a type of event criterion; and
wherein selecting the at least some of the logged shadow requests is based on one or more of the one or more criteria used to classify the logged shadow requests.

19. A shadow proxy system for use with a production system having first computing resources and second computing resources, comprising:
an interceptor, comprising a hardware processor and computer-readable media which contains operating instructions for the hardware processor, that:
performs an asynchronous and non-blocking intercept of at least some production requests to the production system while the first computing resources are in an on-line mode of operation to generate intercepted production requests, a production request being a request for data from the production system;
provides the intercepted production requests to the first computing resources while the first computing resources are in the on-line mode of operation; and
provides the intercepted production requests to a shadow proxy service as shadow requests; and
the shadow proxy service, comprising a hardware processor and computer-readable media which contains operating instructions for the processor, the hardware processor and computer-readable media of the shadow proxy service not being the hardware processor and computer-readable media of the interceptor, that:
logs the shadow requests as logged shadow requests;
selects at least some of the logged shadow requests as selected shadow requests; and
sends the selected shadow requests to the second computing resources for replay as replayed shadow requests by the second computing resources while the second computing resources are in an off-line mode of operation;
wherein the shadow proxy service selects and sends additional logged shadow requests to the second computing resources for replay as replayed shadow requests until one or more conditions regarding the replayed shadow requests is satisfied, and the replayed shadow requests include a mix of use cases to control a warm-up duration for the second computing resources; and
wherein the selected shadow requests sent to the second computing resources prepare a cache of the second computing resources to reduce start-up delay of the second computing resources for a subsequent on-line mode of operation.

20. The shadow proxy system as recited in claim 19, wherein:
each logged shadow request includes a time of day;
the shadow proxy service classifies the shadow requests based on classification criteria;
the classification criteria include a time of day criterion; and
the shadow proxy service selects the at least some of the logged shadow requests based at least in part on a time of day of the logged shadow requests.

21. The shadow proxy system as recited in claim 19, wherein:
the shadow proxy service processes the shadow requests by classifying the shadow requests based on classification criteria;
the classification criteria include a type of event criterion; and
the shadow proxy service selects the at least some of the logged shadow requests based at least in part on a type of event of the logged shadow requests.

22. A shadow proxy system for use with a production system comprising a plurality of production machines, the shadow proxy system comprising:
a hardware processor and computer-readable media which contains operating instructions for the hardware processor that causes the shadow proxy system to:
perform an asynchronous and non-blocking intercept of at least some production requests to the production system while a first production machine of the plurality of production machines is in an on-line mode of operation to generate intercepted production requests, a production request being a request for data from the production system;
log the intercepted production requests as logged shadow requests;
select at least some of the logged shadow requests as selected shadow requests;
send the selected shadow requests to the production system for replay as replayed shadow requests by a second production machine of the plurality of production machines while the second production machine is in an off-line mode of operation; and
request the production system to process additional shadow requests for replay as additional replayed shadow requests by the second production machine until one or more conditions regarding the additional replayed shadow requests is satisfied, wherein the additional replayed shadow requests include a mix of use cases to control a warm-up duration for the second production machine;
wherein the selected shadow requests prepare a cache of the second production machine to reduce start-up delay of the second production machine for a subsequent on-line mode of operation.

23. The shadow proxy system as recited in claim 22, wherein:
each logged shadow request has a time of day;
the shadow proxy system classifies the shadow requests based on classification criteria;
the classification criteria include a time of day criterion; and
the shadow proxy system selects the at least some of the logged shadow requests based at least in part on a time of day of the logged shadow requests.

24. The shadow proxy system as recited in claim 22, wherein:
- the shadow proxy system classifies the shadow requests based on classification criteria;
- the classification criteria include a type of event criterion; and
- the shadow proxy system selects the at least some of the logged shadow requests based at least in part on a type of event of the logged shadow requests.

25. The shadow proxy system as recited in claim 22, wherein the selected shadow requests prepare the cache of the second production machine for the on-line mode of operation by a predetermined event.

26. The shadow proxy system as recited in claim 25, wherein the predetermined event is a time of day.

27. The shadow proxy system as recited in claim 25, wherein the predetermined event is an expected next surge of production requests.

28. The shadow proxy system as recited in claim 25, wherein the predetermined event is expected event-specific traffic.

* * * * *